United States Patent

Narahara et al.

[11] Patent Number: 5,850,298
[45] Date of Patent: Dec. 15, 1998

[54] IMAGE PROCESSING DEVICE ELIMINATING BACKGROUND NOISE

[75] Inventors: Kouichi Narahara, Yokohama; Satoshi Ohuchi, Hachioji, both of Japan

[73] Assignee: Ricoh Company, Ltd., Tokyo, Japan

[21] Appl. No.: 877,902

[22] Filed: Jun. 18, 1997

Related U.S. Application Data

[63] Continuation of Ser. No. 407,656, Mar. 21, 1995, abandoned.

[30] Foreign Application Priority Data

Mar. 22, 1994 [JP] Japan .................................. 6-050741
Mar. 25, 1994 [JP] Japan .................................. 6-055605

[51] Int. Cl.$^6$ .................................................. G03F 3/08
[52] U.S. Cl. .................. 358/518; 358/501; 358/521; 358/538; 358/463; 358/462; 358/465; 358/464; 358/453
[58] Field of Search .................................. 358/515, 521, 358/518, 538, 532, 522, 512, 530, 501, 531, 462, 453, 465, 466, 464, 463; 382/237, 270, 275

[56] References Cited

U.S. PATENT DOCUMENTS

| | | | |
|---|---|---|---|
| 4,672,461 | 6/1987 | Yoshida | 358/466 |
| 4,893,188 | 1/1990 | Murakami et al. | 358/464 |
| 4,914,524 | 4/1990 | Kimura | 358/464 |
| 5,079,624 | 1/1992 | Sasuga et al. | 358/530 |
| 5,166,808 | 11/1992 | Kawata | 358/464 |
| 5,245,417 | 9/1993 | Hibi et al. | 358/518 |
| 5,282,061 | 1/1994 | Farrell | 358/464 |
| 5,317,420 | 5/1994 | Kuwahara | 358/530 |
| 5,323,212 | 6/1994 | Fukui | 355/319 |
| 5,602,939 | 2/1997 | Hashiguchi et al. | 382/162 |

FOREIGN PATENT DOCUMENTS 4-313744 11/1992 Japan .
5-23667 4/1993 Japan .

OTHER PUBLICATIONS

Transactions of Institute of Electronics, Information and Communication Engineers, Jan., 1992, vol. J–75–D–II, No. 1, pp. 39–47, Satoshi Ohuchi, et al., Segmentation Method for Documents Containing Text/Picture (Screened Halftone, Continuous Tone).

*Primary Examiner*—Edward L. Coles
*Assistant Examiner*—Cheukfan Lee
*Attorney, Agent, or Firm*—Oblon, Spivak, McClelland, Maier & Neustadt, P.C.

[57] ABSTRACT

An image processing device forming a reproduced image from a plurality of color recording signals, each of which is generated at a corresponding one of scans on an original image and derived from color digital signals obtained at the corresponding one of the scans, includes a threshold-value generation unit generating a threshold value based on the color digital signals at a first one of the scans, and a background removal unit reducing background noise in the reproduced image by using the threshold value at second and following ones of the scans.

18 Claims, 26 Drawing Sheets

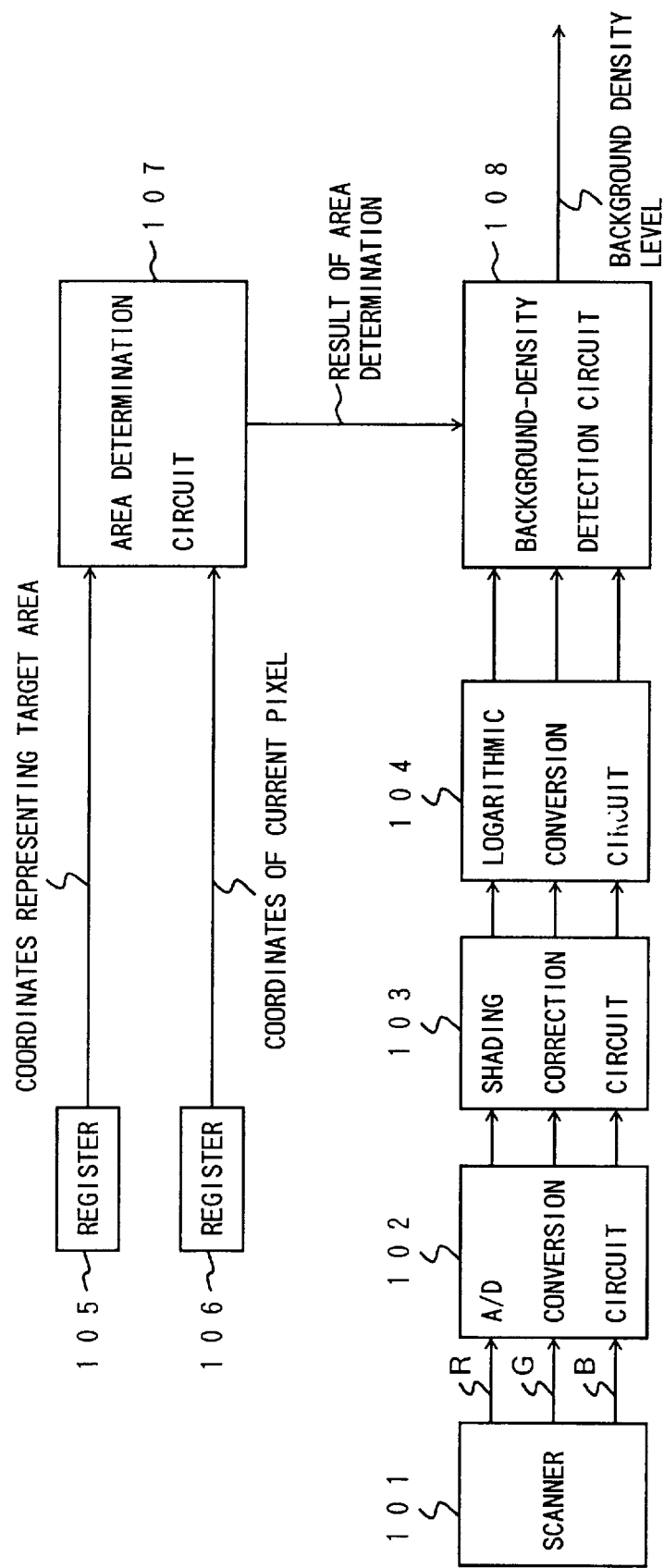
F I G. 9

F I G.12
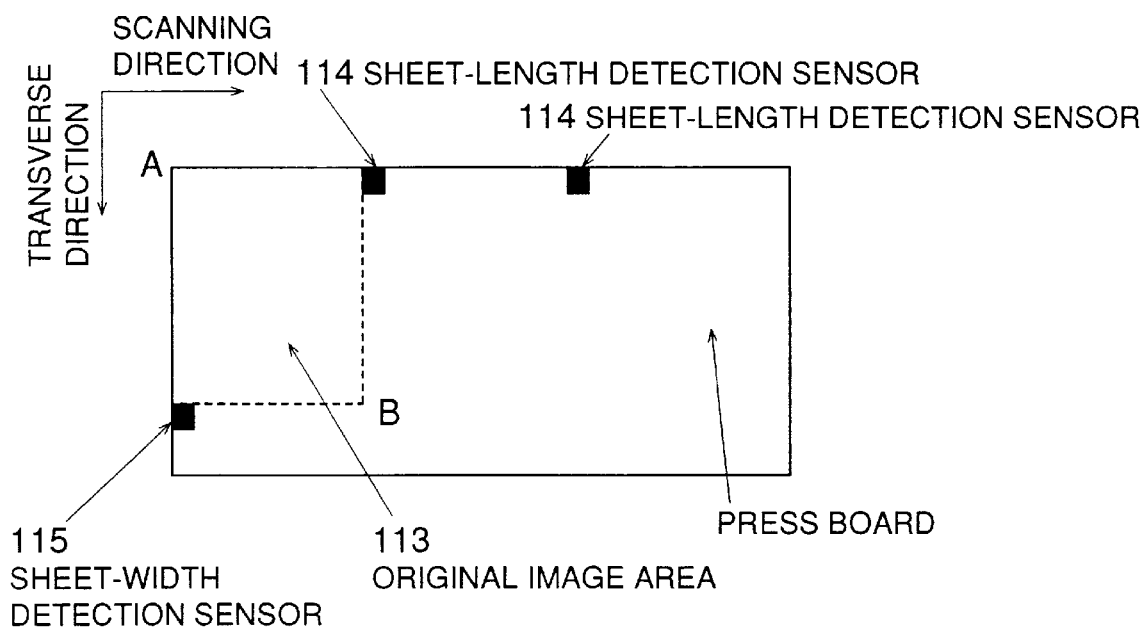

F I G.14
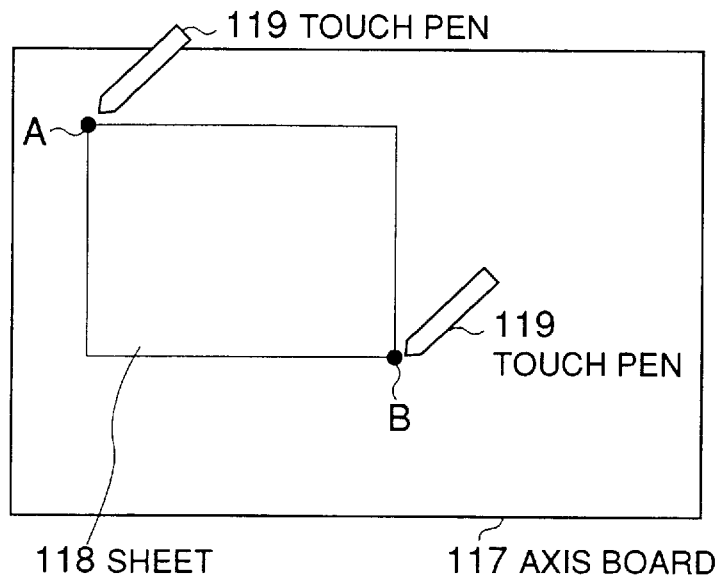
F I G.15
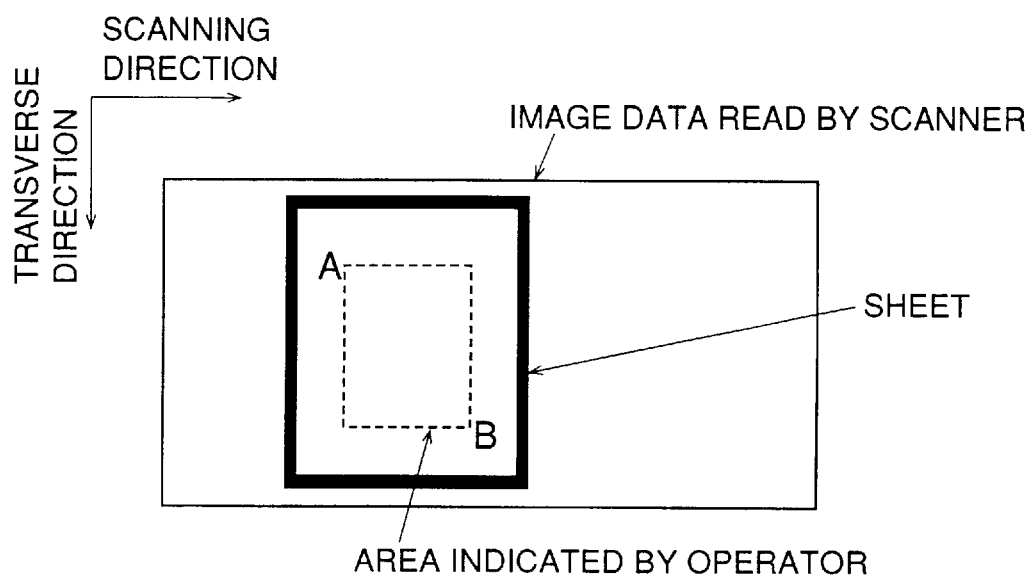

F I G.20
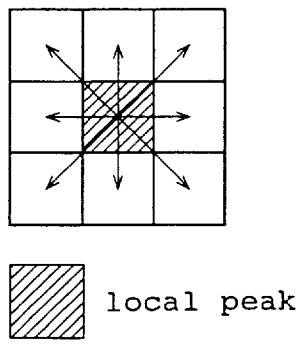
local peak
F I G.21
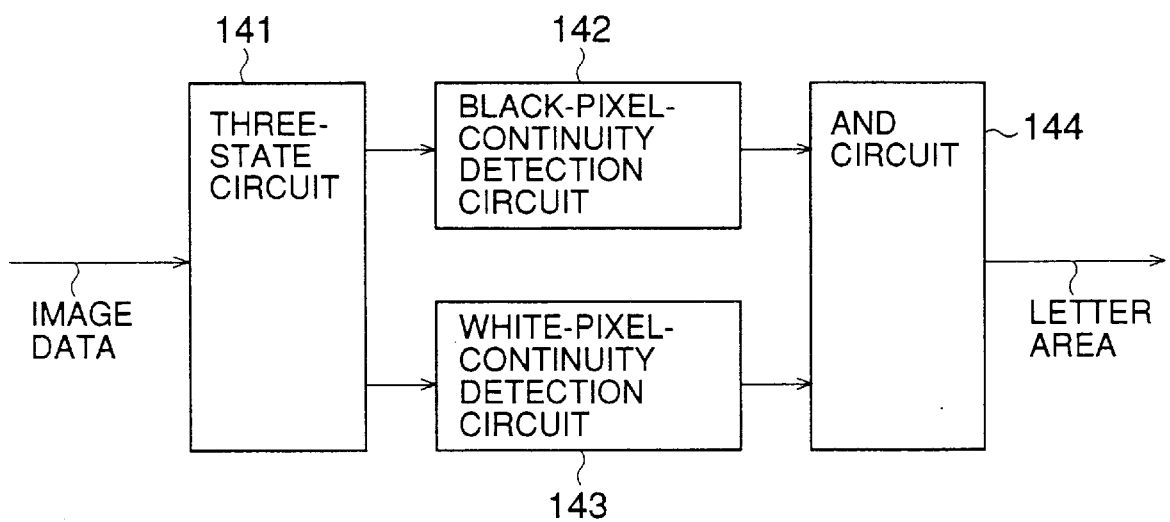

— ARBITRARY

● BLACK PIXEL

— ARBITRARY

○ WHITE PIXEL

F I G.25
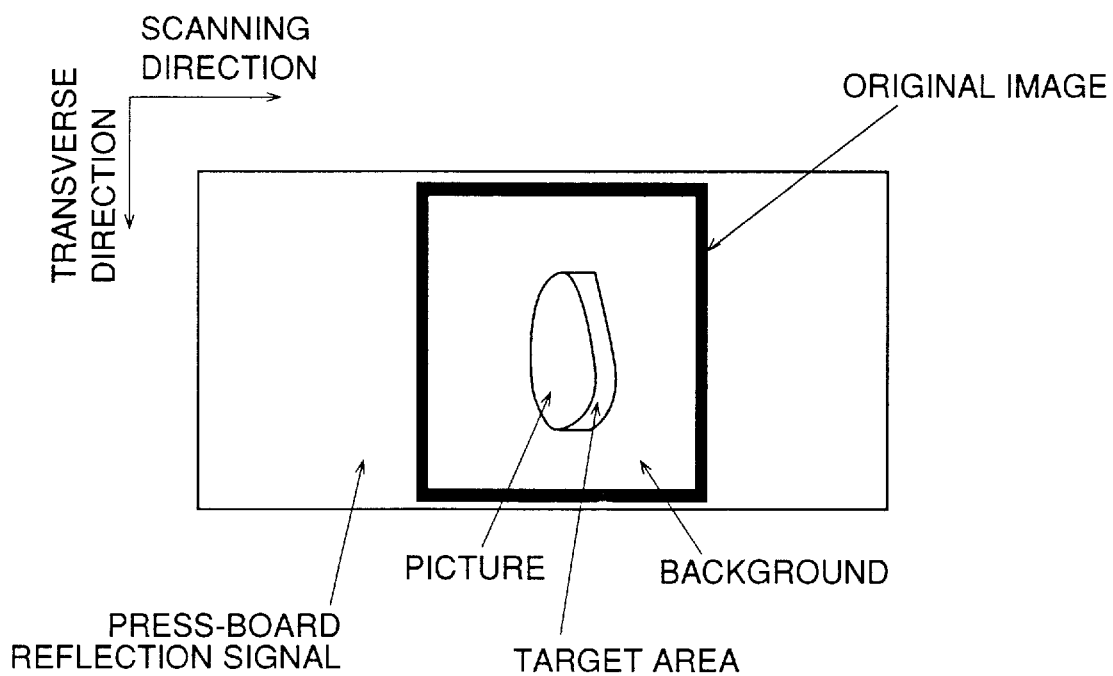

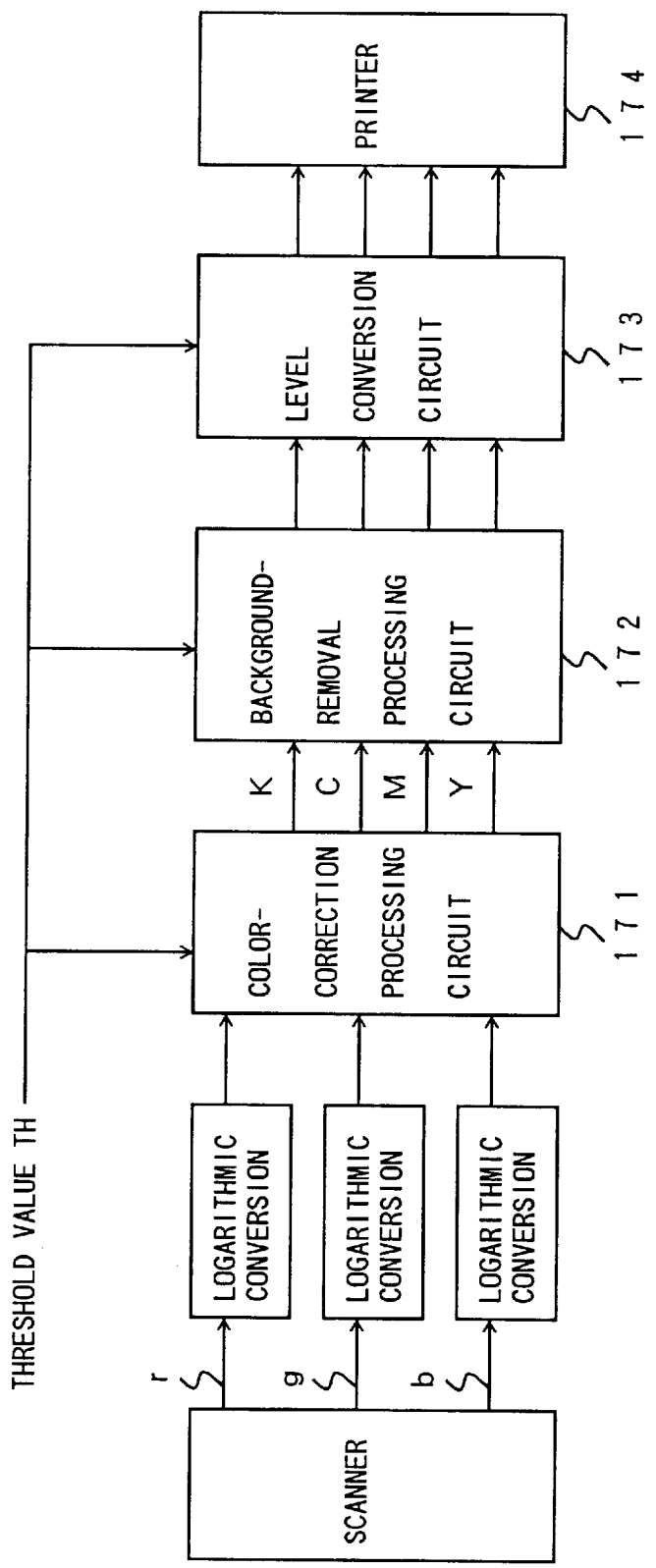
F I G. 27

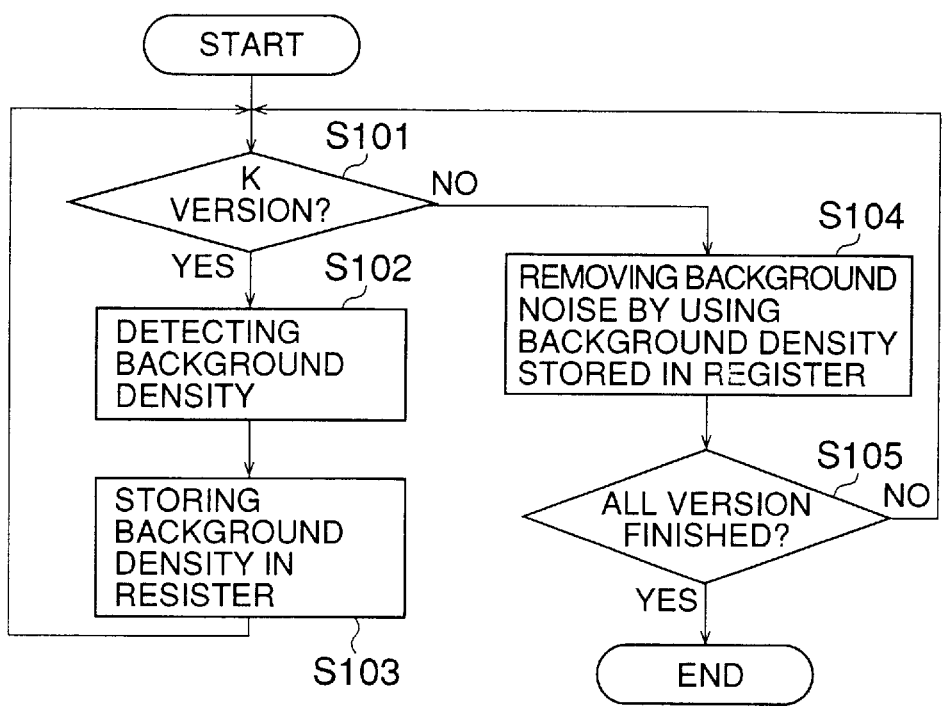
F I G.28

| BACKGROUND DENSITY | 193<br>0~20 | 194<br>20~40 | 195<br>40~255 |
|---|---|---|---|
| TH1 | 32 | 75 | 75 |
| TH2 | 64 | 84 | 100 |
| TH3 | 96 | 111 | 125 |
| TH4 | 128 | 138 | 150 |
| TH5 | 160 | 165 | 175 |
| TH6 | 192 | 192 | 200 |
| TH7 | 224 | 219 | 225 |

192 LEVEL-CONVERSION THRESHOLD VALUE TABLE

IMAGE PROCESSING DEVICE ELIMINATING BACKGROUND NOISE

This application is a Continuation of application Ser. No. 08/407,656, filed on Mar. 21, 1995, now abandoned.

BACKGROUND OF THE INVENTION

1. Field of the Invention

The present invention generally relates to image processing devices, and particularly relates to an image processing device which can reliably estimate a background intensity level and enhance image quality by removing background noise.

2. Description of the Prior Art

Image processing devices such as copy machines scan an original image with an image scanner, and output the scanned image on a printer or a display. Unfortunately, the output image can have conspicuous smudges on a background which should appear to be uniform. These smudges may actually reflect variations in densities of a background of the original image, but serve as background noise which degrades image quality of the output image. In addition to the degradation of image quality, a large amount of ink can be consumed wastefully, since ink is used even for printing the undesirable background noise.

In order to obviate these problems in the prior art, background patterns are eliminated prior to printing. This is performed by identifying pixels having relatively small densities and by replacing the values of these pixels with zero values. A typical method of detecting the background area first sets a threshold value, and identifies a background by finding pixels having values smaller than the threshold value. Methods of determining the threshold value include a method which allows users to set the threshold value, and a method which sets the threshold value automatically based on characteristics of an original image. The method allowing users to set the threshold value can effectively eliminate the background noise if the threshold value is set to an appropriate value. However, if the threshold value is set too low, some background patterns can remain. On the other hand, if the threshold value is set too high, highlights of picture areas and letters with small contrasts may be eliminated.

The original image may be comprised of multiple image types such as, for example, a newspaper having a high-density background and a copy sheet having a low-density background. Thus, if the background noise is eliminated by using a threshold value appropriate for eliminating the newspaper background, highlights of picture areas and letters with small contrasts may be eliminated, and letters may become too thin to be legible on the copy sheet. On the other hand, if the background noise is eliminated based on the background of the copy sheet, the background noise on the newspaper cannot be removed. In light of this example, it can be understood that a more sophisticated way of setting a threshold value is required.

An automatic setting of the threshold value can be done in realtime based on a pixel-by-pixel processing or a block-by-block processing. However, realization of an accurate setting of the threshold value requires an image analysis taking into account the characteristics of the original image, which analysis takes too long a time for processing. For example, the Japanese Laid-Open Patent Application No.4-313744 describes a method of an automatic setting of a threshold value. This method creates histograms for predetermined areas of an original image at a time of prescanning. Then, the method automatically determines a background density based on the histograms, by utilizing the fact that the density of the background is typically lower than that of other areas. Since this method requires a prescan for the determination of the threshold value, a time length for conducting the prescan adds to a total processing time in addition to the time needed for the analysis of image characteristics.

Adding to the difficulty of eliminating background noise, a density of a press board is also included in image data when an original image is scanned by an image input device such as a copy machine. Here, the term 'press board' refers to a cover of a copy machine which is attached over a scan window and is used to cover an original sheet when scanning the sheet. For example, the method described in the above patent application has a problem that the density of the press board can be detected as a density of the background, the method thus failing to determine a proper threshold value.

A method which is disclosed in the Japanese Patent Publication No.5-23667 restricts the color of the press board to a black color in order to detect an edge of a sheet bearing an original image. After detecting the edge of the sheet, the method detects a density of a white level in an area extending for a predetermined length from the edge. Thus, when a background area does not exist at the edge of the sheet, this method cannot detect a density of the background.

Accordingly, there is a need in the field of image processing devices for an image processing device which can eliminate background noise at a high speed so that a resulting output image has a high image quality.

Also, there is a need for an image processing device which can eliminate background noise at a high speed so that a resulting output image has a high image quality by automatically setting an accurate threshold value without conducting a prescan.

Also, there is a need for an image processing device which can reliably detect a density of a background of an original image by distinguishing the background of the original image from a press board.

SUMMARY OF THE INVENTION

Accordingly, it is a general object of the present invention to provide an image processing device which can satisfy the needs described above.

It is another and more specific object of the present invention to provide an image processing device which can eliminate background noise at a high speed so that a resulting output image has a high image quality.

It is yet another object of the present invention to provide an image processing device which can eliminate background noise at a high speed so that a resulting output image has a high image quality by automatically setting an accurate threshold value without conducting a prescan.

In order to achieve the above objects, according to a first principle of the present invention, an image processing device forming a reproduced image from a plurality of color recording signals, each of which is generated at a corresponding one of scans on an original image and derived from color digital signals obtained at the corresponding one of the scans, includes a threshold-value generation unit generating a threshold value based on the color digital signals at a first one of the scans, and a background removal unit reducing background noise in the reproduced image by using the threshold value at second and following ones of the scans.

In the image processing device described above, the threshold value automatically obtained at the time of the first scan is used for the second and following scans. Thus, background noise can be eliminated reliably at a high speed without a need for a prescan.

It is still another object of the present invention to provide an image processing device which can reliably detect a density of a background of an original image by distinguishing the background of the original image from a press board.

In order to achieve the above object, an image processing device according to a second principle of the present invention includes an input unit for reading an original image and producing digital image data, an area determination unit for detecting pixels of the digital image data which lie within a predetermined area, a background-density detection unit for detecting a background density of the digital image data by using the pixels, a background removal unit for eliminating background noise by using the background density, and an output unit for generating a reproduced image in which the background noise is eliminated.

In the image processing device described above, the pixels used for obtaining the background density are those which lie within the predetermined area. Thus, a proper setting of the predetermined area can realize detection of an area which exists within the original image and does not include a press board area. This leads to a reliable detection of the background density in which the background of the original image is distinguished from the press board.

Other objects and further features of the present invention will be apparent from the following detailed description when read in conjunction with the accompanying drawings.

BRIEF DESCRIPTION OF THE DRAWINGS

FIG. 9 is a block diagram of a first embodiment of an image processing device according to a second principle of the present invention;

FIG. 12 is an illustrative drawing of an original image area detected by an original-image-size detection circuit of FIG.11;

FIG. 14 is an illustrative drawing showing a schematic structure of an area indication editor of FIG. 13;

FIG. 15 is an illustrative drawing showing an example of an area indicated by an operator;

FIG.20 is an illustrative drawing showing how to detect a dot;

FIG. 21 is a block diagram of a letter area detection unit used in the fourth embodiment;

FIG. 25 is an illustrative drawing showing a target area for detecting a background density in the fifth embodiment;

FIG. 27 is a block diagram of a seventh embodiment of an image processing device according to the second principle of the present invention;

FIG. 28 is a flow-chart of an operation of the image processing device of FIG. 27;

DESCRIPTION OF THE PREFERRED EMBODIMENTS

In the following, two principles of the present invention and embodiments of these principles will be described with reference to the accompanying drawings.

Figure 1A:
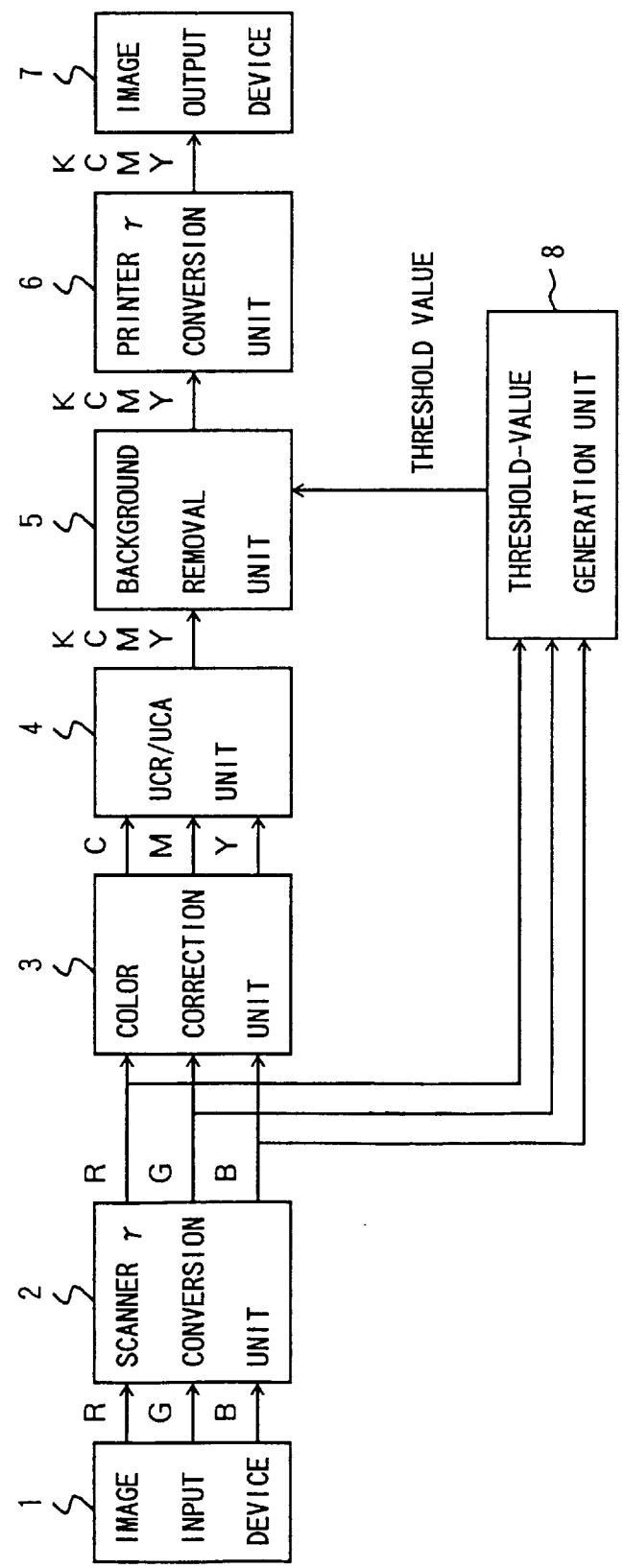
FIGS. 1A and 1B are block diagrams of image processing devices according to a first principle of the present invention.

FIG. 1A shows a block diagram of a first principle of the present invention, concerning a color image processing device which can eliminate background noise at a high speed so that a resulting output image has a high image quality by automatically setting an accurate threshold value without conducting a prescan.

The color image processing device of the first principle includes an image input device 1, a scanner τ conversion unit 2, a color correction unit 3, an UCR(under color removing)/UCA(under color adding) unit 4, a background removal unit 5, a printer τ conversion unit 6, an image output device 7, and a threshold-value generation unit 8.

R (red component), G (green component), and B (blue component) signals generated by the image input device 1 have a linear relationship with light reflectance on an original image. These R, G, and B signals are subjected to a logarithmic conversion in the scanner τ conversion unit 2 to produce R, G, and B signals which have a linear relationship with density. Then, the color correction unit 3 converts these R, G, and B signals into signals of respective complementary color components, that is, Y (yellow), M (magenta), and C (cyan). The UCR/UCA unit 4 carries out an under color removal process on the Y, M, and C signals so as to obtain an amount of black ink to be applied. This process results in four signals Y, M, C, and K (black component).

The original image is scanned more than one time. For example, it is scanned four times. Then, processes carried out in the units following the UCR/UCA unit 4 are conducted for the K signal at a first scan, the C signal at a second scan, the M signal at a third scan, and the Y signal at a fourth scan. The background removal unit 5 performs a background removal process to lower a density of a background, which process will be later explained. The printer τ conversion unit 6 carries out a density conversion process to obtain color signals appropriately matching characteristics of the image output device 7.

The first principle of the present invention includes obtaining the threshold value for removing the background noise at a time of the first scan. Then, the threshold value thus obtained is used for following scans, that is, the second, the third, and the fourth scans. The threshold value is obtained automatically, not manually, in the threshold-value generation unit 8 by a method which will be described later.

Figure 1B:
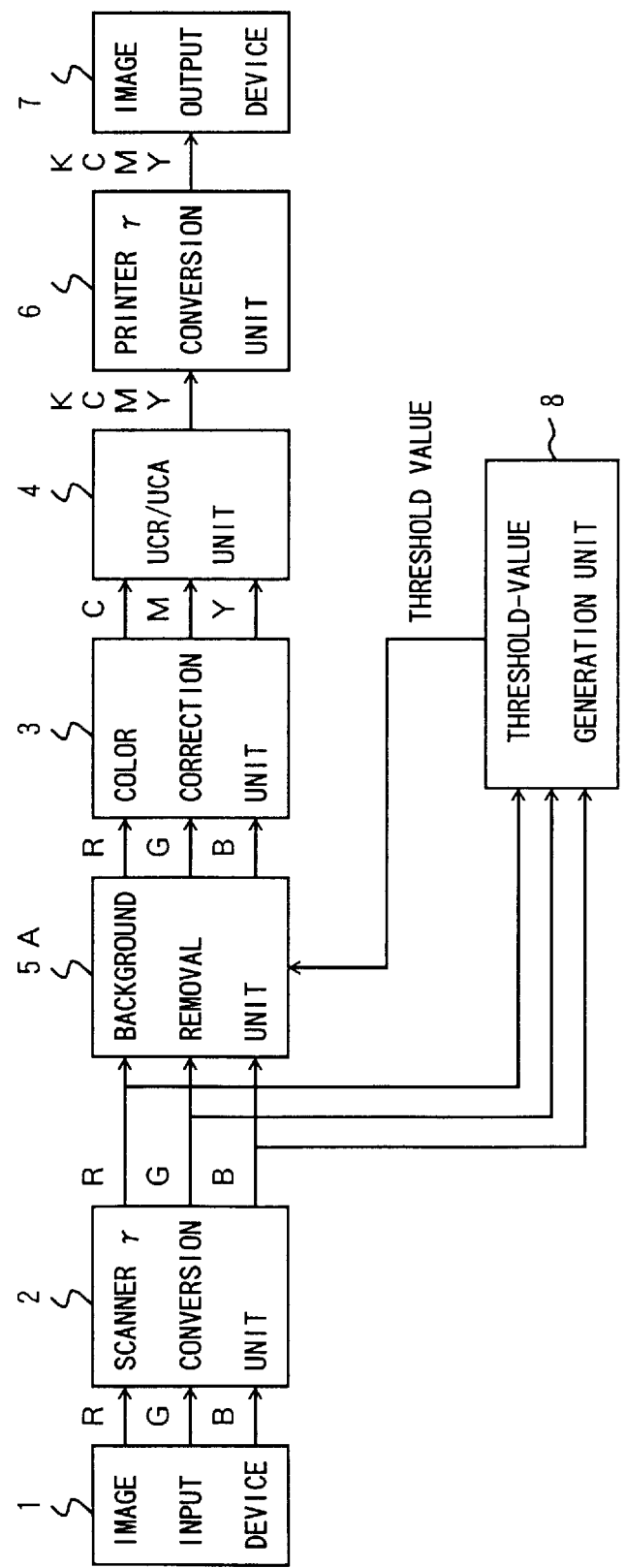

FIG. 1B shows a block diagram showing another example of a color image processing device according to the first principle of the present invention. In FIG. 1B, the same elements as those of FIG. 1A are referred to by the same numerals, and a description thereof will be omitted.

A color image processing device of FIG. 1B differs from that of FIG. 1A only in that a background removal unit 5A is inserted between the scanner τ conversion unit 2 and the color correction unit 3 along the flow of the data processing. Thus, the color image processing device of FIG. 1B performs a background removal process on the R, G, and B signals to lower a density of a background, while that of FIG. 1A performs the process on the Y, M, C, and K signals.

As shown in FIGS. 1A and 1B, there can be a variation as to where the background removal process is performed along the way of the entire image processing.

Figure 2:
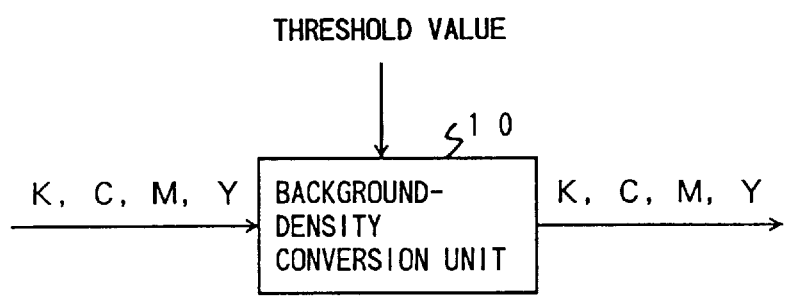
FIG. 2 is a block diagram of a background removal unit of FIG.1 according to a first embodiment of the first principle.
Figure 3:
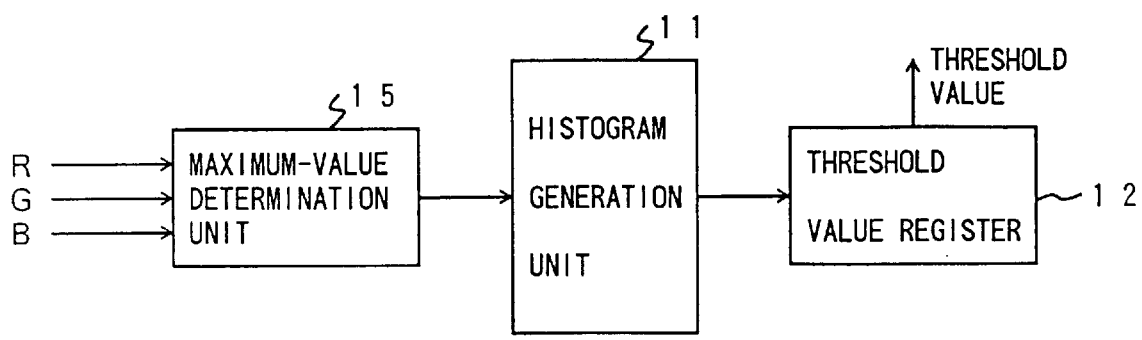
FIG. 3 is a block diagram of a threshold-value generation unit of FIG.1 according to the first embodiment of the first principle.

FIG. 2 and FIG. 3 show a first embodiment of the first principle. FIG. 2 shows a block diagram of the background removal unit 5, and FIG. 3 shows a block diagram of the threshold-value generation unit 8.

In FIG. 2, the background removal unit 5 includes a background-density conversion unit 10. The background removal unit 5 lowers the density of the background by using the threshold value determined at the threshold-value generation unit 8 of FIG. 1. As noted above, the threshold-value generation unit 8 automatically determines the threshold value, and sends it to the background removal unit 5.

The background density conversion unit 10 receives the threshold-value and one of the K, C, M, and Y signals each at a corresponding scan. Then, the background density conversion unit 10 converts a density of an incoming pixel into zero, if a value of that pixel is lower than the threshold-value. If the value of the incoming pixel is no smaller than the threshold-value, the background-density conversion unit 10 outputs the incoming pixel values without any conversion.

A method of converting the density can be any method as long as it lowers the density. Thus, for example, a method of converting the density may subtract an adaptive value, which is changeable according to some features of surrounding pixels, from a value of a pixel belonging to the background. Namely, the adaptive values (Vk, Vc, Vm, Vy) may be determined based on some features of the surrounding pixels, and, then, may be deducted from the pixel values (K, C, M, Y) so as to obtain output values (K-Vk, C-Vc, M-Vm, Y-Vy).

In the background density conversion unit 10, the K, C, M, and Y signals are compared with the threshold value. However, the threshold value, which is determined by using the R, G, and B signals, may not be actually comparable with the K, C, M, and Y signals. In order to make it comparable, the background density conversion unit 10 holds an offset value, and adds it to the threshold value. Actually, the sum of the offset value and the threshold value is the value which is compared with the incoming pixel values at the background density conversion unit 10.

In practice, when pixel data is represented by 8 bits (256 gray levels), the offset value may be set to a value ranging from 5 to 10 to bring about a satisfactory result. However, a value set for the offset value depends on such variables as the amount of dirt on an original image sheet and precision of the scanner. Thus, for example, the offset value may need to be increased as the dirt on the original image sheet increases.

In FIG. 3, the threshold-value generation unit 8 includes a maximum-value determination unit 15, a histogram generation unit 11, and a threshold value register 12. The maximum-value determination unit 15 receives the R, G, and B signals from the scanner τ conversion unit 2 at the time of the first scan. Then, the maximum-value determination unit 15 determines for each pixel which one of the R, G, and B values is the largest among the three, and sends the maximum value to the histogram generation unit 11. The histogram generation unit 11 makes a histogram of the maximum values of all the pixels.

Figure 4:
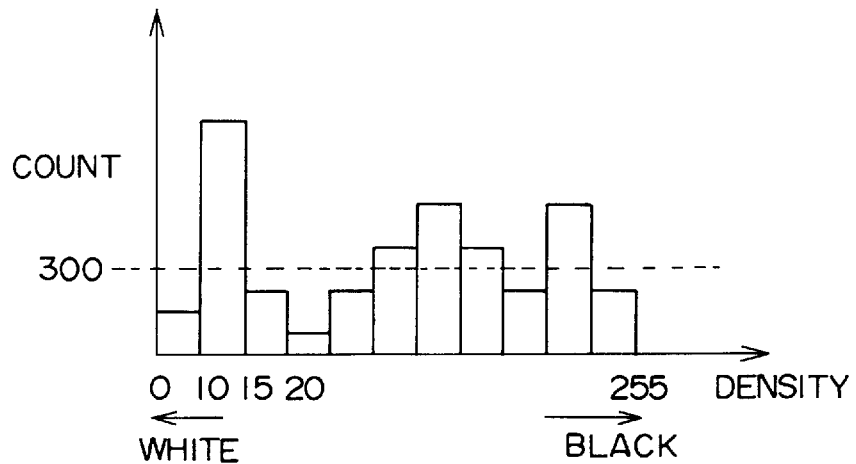
FIG. 4 is a graph showing an example of a histogram setting density intervals to five units.

FIG. 4 shows an example of such a histogram made by setting a density interval to 5. In the histogram, the density nearest to the zero level which exceeds a predetermined count (300 pixels in FIG. 4) is determined to be a background density. In FIG. 4, a density ranging from 10 to 15 is the nearest to the zero level among densities exceeding the 300 count. Thus, the density 15 is determined to be the background density. This background density of 15 is stored in the threshold value register 12 as the threshold value for removing the background noise.

The process of determining and storing the threshold value described above is conducted at the time of the first scan. The following scan uses the value stored in the threshold value register 12 as the threshold value for removing the background noise.

The first embodiment of the first principle can be performed in various ways. For example, any one of the K, C, M, and Y signals can be obtained at the time of the first scan, and, at the same time, the threshold value to be used for the following scans can be automatically obtained. Or, any one of the C, M, and Y signals can be obtained at the time of the first scan, and, at the same time, the threshold value to be used for the following scans can be automatically obtained.

As described above, the threshold value to be used for the second scan and the following scans is obtained at the time of the first scan, and cannot be used for the first scan itself. Thus, a certain threshold value must be given for eliminating background noise for the first scan. This is done by storing a predetermined threshold value in the threshold value register 12 of FIG.3 prior to the first scan. For example, a threshold value of 20 may be set beforehand in the threshold value register 12 for use as the threshold value for eliminating background noise of the first scan. Then, after the first scan, another threshold value automatically determined for the following scans can be stored in the threshold value register 12, replacing the threshold value used for the first scan.

Figure 5:
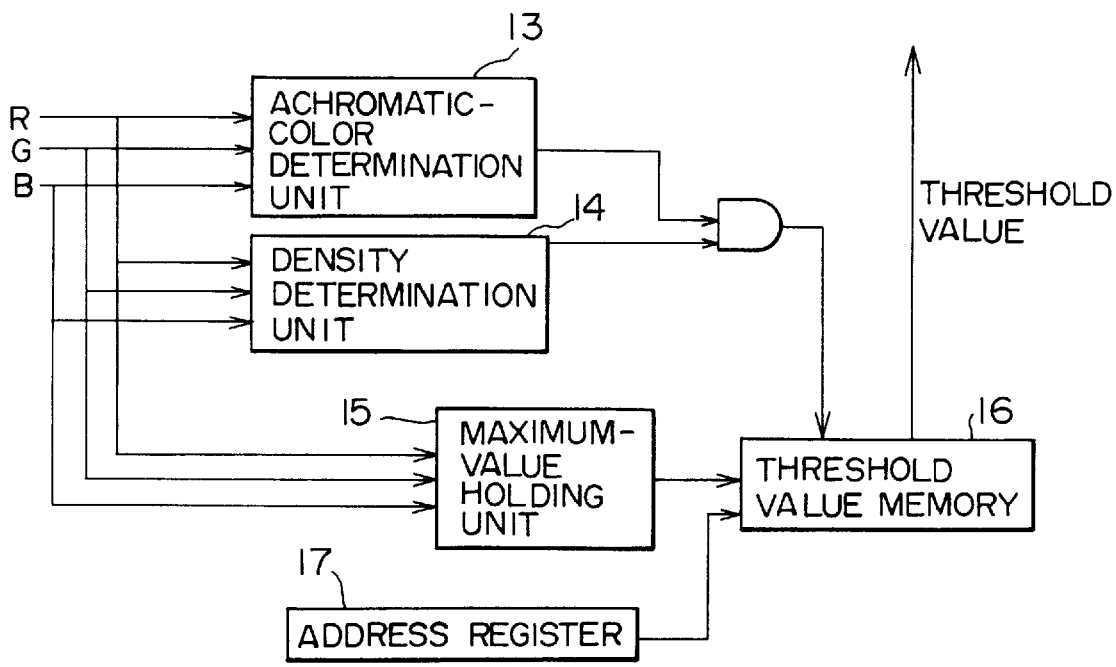
FIG. 5 is a block diagram of a threshold-value generation unit according to a second embodiment of the first principle.

FIG. 5 shows a threshold-value generation unit according to a second embodiment of the first principle of the present invention.

In the first embodiment, the threshold value used for the first scan is fixed to the predetermined threshold value, such as 20 as in the previous example. In the second embodiment, however, a threshold value is determined in realtime by using pixel values. That is, the threshold-value generation unit of the second embodiment generates a threshold value locally and in realtime as a scan progresses.

In FIG. 5, the threshold-value generation unit includes an achromatic-color determination unit 13, a density determination unit 14, a maximum-value holding unit 15, a threshold value memory 16, and an address register 17.

The achromatic-color determination unit 13 receives the R, G, and B signals from the scanner τ conversion unit 2 of FIG. 1. Then, the achromatic-color determination unit 13 determines whether a current pixel is an achromatic color. This determination is carried out by comparing Max(R, G, B) minus Min(R, G, B) with a predetermined value, which is 10 in this embodiment. If Max(R, G, B) minus Min(R, G, B) is less than 10, it is determined that the current pixel has an achromatic color.

The density determination unit 14 also receives the R, G, and B signals from the scanner τ conversion unit 2 of FIG. 1. Then, the density determination unit 14 determines whether the current pixel has a highlight color. This is done by comparing Max(R, G, B) with a predetermined value, which is 30 in this embodiment. Namely, Max(R, G, B) less than 30 means that the current pixel has a highlight color.

If the current pixel is determined to be an achromatic and highlight color, the value of Max(R, G, B) is stored in the threshold value memory 16. The threshold value memory 16 outputs this value to the background removal unit 5 of FIG. 1, which uses this value as a threshold value for eliminating background noise. The address register 17 for the threshold value memory 16 holds an address indicative of the current pixel. That is, the threshold value is determined for each pixel in this embodiment, and is stored at a corresponding address in the threshold value memory 16. For the second and following scans, the threshold values stored in the threshold value memory 16 are used for eliminating background noises.

Figure 6:
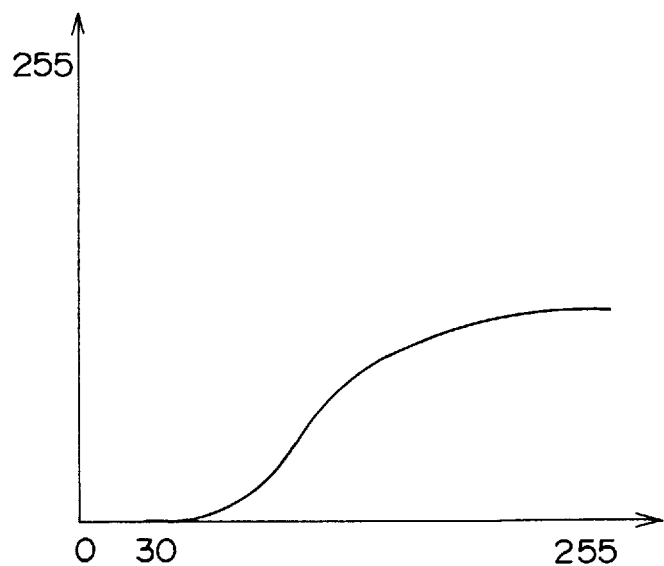
FIG. 6 is a graph showing a function realized by a conversion table used for a third embodiment of the first principle.
Figure 7:
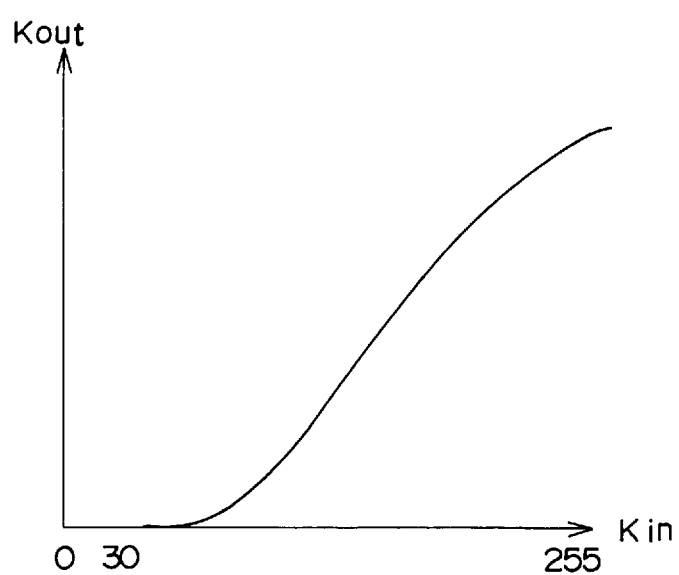
FIG. 7 is a graph showing a function realized by another conversion table used for the third embodiment of the first principle.

A third embodiment of the first principle of the present invention will be described below with reference to FIG.6 and FIG. 7.

In order to enhance accuracy of chromatic highlight colors reconstructed by the image processing device, these highlight colors are not printed with a black ink. Thus, the K signal having a density less than a background level, which signal is generated by the UCR/UCA process or the printer τ conversion process, should have a density of zero. The third embodiment is concerned with a method of producing the K signal, in the UCR/UCA removal process or the printer τ conversion process, whose density is zero when it is less than a background density. In this embodiment, there is no need to carry out a process of eliminating background noise for the K signal, so that the first scan can be conducted for the K signal without the background elimination.

First, a method of producing the K signal whose density is zero when it is less than a background level will be described with regard to the UCR/UCA process. The UCR/UCA unit 4 of FIG. 1 receives the Y, M, and C signals for each pixel, and generates the K signal by taking a minimum value among the Y, M, and C signals and converting the minimum value based on a conversion table. An example of such a conversion table is shown in FIG. 6. In FIG. 6, the axis of abscissas indicates a value to be converted, which is the minimum value described above. The axis of ordinates shows a converted value, which is the K signal. As can be seen in FIG. 6, densities below a predetermined background density (30 in this case) are all converted to zero, in order to have the K signal of zero for highlight colors. After obtaining the K signal, the Y, M, and C signals are converted by subtracting the value of the K signal from each of the three signals.

Next, a method of producing the K signal whose density is zero when it is less than a background level will be described with regard to the printer τ conversion process. The printer τ conversion unit of FIG. 1 receives the K signal, which will be referred to as Kin. Then, the printer τ conversion unit 6 converts the Kin signal by using a conversion table so as to obtain an output K signal Kout. An example of such a conversion table is shown in FIG. 7. As can be seen in FIG. 7, the Kin signals having a density less than a predetermined background density (30 in this case) are all converted to zero to produce the Kout signal of zero. Thus, when the Kin signal is less than the background level, no black ink will be printed.

A fourth embodiment of the first principle of the present invention will be described below. In the fourth embodiment, a threshold value is obtained not only at the first scan, but also at the second scan and the third scan. Then, a combination of more than one threshold value is used for the third and fourth scans, instead of a single threshold value obtained at the first scan as in the previous embodiments.

Figure 8A:
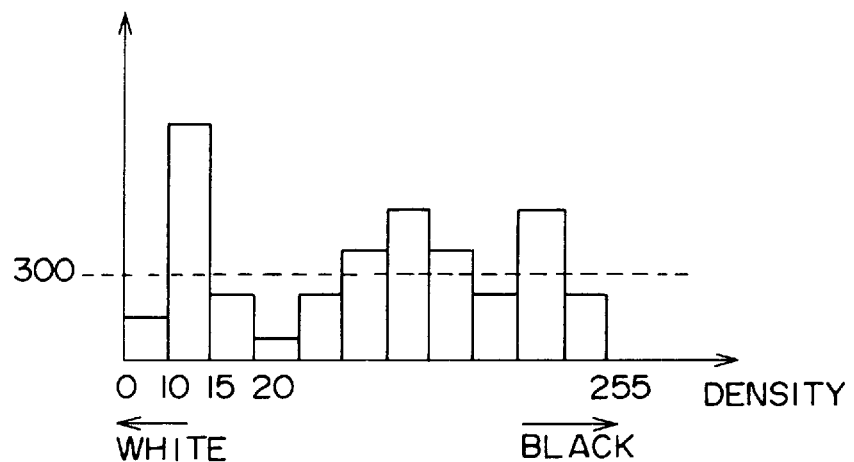
FIGS. 8A to 8C are graphs showing examples of histograms made at first, second, and third scans, respectively.
Figure 8B:
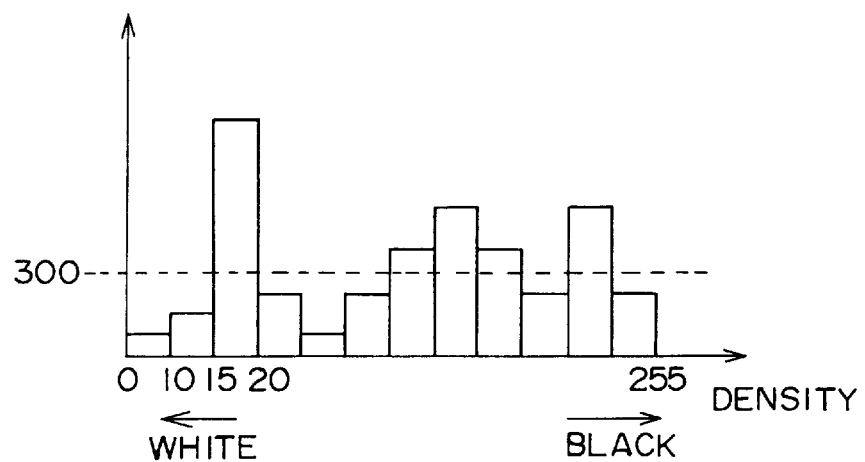
Figure 8C:
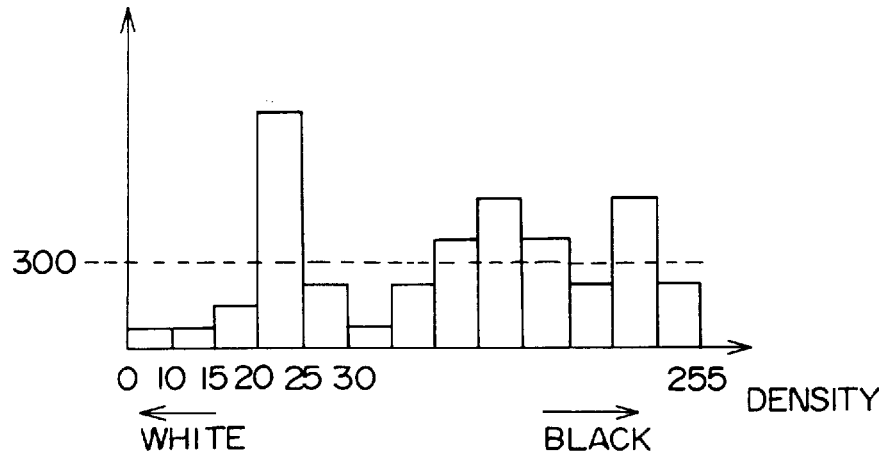

FIGS. 8A to 8C show exemplary histograms made from Max(R, G, B) data of all the pixels for the first scan, the second scan, and the third scan. As can be seen in the figures, these histograms are slightly different from each other because of temporal variations in scanner characteristics. Thus, when a threshold value determined at the first scan is used for the following scans, background noise may not be removed because the temporal variations in the scanner characteristics are not taken into account. In the example of FIGS. 8A to 8C, the background density is 15 at the time of the first scan. However, it is changed to 25 at the time of the third scan because of the temporal variations. As a result, if the background density of 15 which is determined at the first scan is used for eliminating the background noise of the third scan, pixels having a density between 15 and 25 cannot be removed.

In the fourth embodiment of the first principle, threshold values are automatically determined at the first, second, and third scans in the same manner as in the first embodiment in order to set the threshold value to a more reliable value. These threshold values are stored in registers for later use.

For example, threshold values used for the second and following scans may be determined in the following manner.

| ORDER OF SCAN | THRESHOLD VALUE |
|---|---|
| FIRST SCAN | TH1 |
| SECOND SCAN | TH2 + (TH2 − TH1) |
| THIRD SCAN | TH3 + (TH3 − TH2) |

Here, TH1 denotes the threshold value determined at the time of the first scan, TH2 denotes the threshold value at the second scan, and TH3 denotes the threshold value at the third scan. Assume that TH1 is 15 and TH2 20. As can be seen, the threshold value of 15 determined at the first scan is not used for the third scan. Instead, TH2 plus TH2 minus TH1, which is 25, is used for the third scan. The reason for this is that when there is an increase by 5 (TH2 minus TH1) in background levels from the first scan to the second scan, there will probably be the same increase from the second scan to the third scan. Thus, 25 (TH2) plus 5 (TH2 minus TH1) may be a proper estimate for a background level of the third scan.

In this manner, threshold values can be set to more reliable values, even if there are temporal variations in scanner characteristics.

The first principle of the present invention is not limited to the examples described above, but can be applied to image processing devices, color copy machines, image enhancing devices, etc., when there is a need for background noise removal resulting in an output image having a high image quality without conducting a prescan.

In the following, a second principle of the present invention and its embodiments will be described with reference to the accompanying drawings.

The second principle of the present invention is concerned with an image processing device which can reliably detect a density of a background of an original image by distinguishing the background of the original image from a press board. If a background density of the original image is to be detected precisely when the press board has a white color, a white color of the press board must be distinguished from a white color of the original image background. In the second principle, this distinction is made by an instruction given externally or by an automatic determination process.

FIG. 9 shows an image processing device according to a first embodiment of the second principle of the present invention. In FIG. 9, the image processing device includes a scanner 101, an A/D conversion circuit 102, a shading correction circuit 103, a logarithmic conversion circuit 104, registers 105 and 106, an area determination circuit 107, and a background-density detection circuit 108.

In FIG. 9, the scanner 101 includes photoelectric conversion devices such as CCD sensors, which scan the original image (not shown) to produce R, G, and B analog signals. In general, the CCD sensors are arranged in a line along a scanning direction, and the line of the CCD sensors or a mirror is moved in a transverse direction to read the original image. The A/D conversion circuit 102 converts the R, G, and B analog signals into digital signals of 8 bits, for example. The shading correction circuit 103 corrects a distribution of light from a light source illuminating the original image, and also corrects a variation in the CCD sensors. The logarithmic conversion circuit 104 converts signals in a linear relation with reflectance into signals in a linear relation with density. For example, when each pixel value is represented by a digital signal having 8 bits, the R, G, and B density signals range from 0 to 255. Thus, the whitest color is represented by (R, G, B) equal to (0, 0, 0), and the blackest color by (R, G, B) equal to (255, 255, 255).

Here, when the R, G, and B signals are in a linear relation with reflectance, 255 represents the brightest color, and 0 represents the darkest color. Also, reflectance means a ratio of the intensity of reflected light (Ir) to the intensity of illumination light (Io), i.e., Ir/Io (smaller than 1). A logarithmic conversion of the reflectance (=log(Ir/Io)) is called a density.

The first embodiment of the second principle uses data of the RGB density which is converted from a reflectance signal read by the scanner. However, the first embodiment is not limited to this example, but can use other color representations such as $L^*u^*b^*$ signals, $L^*a^*b^*$ signals, Y, M, and C signals, etc.

The register 105 stores coordinates to represent a target area for detecting a background level. The register 106 stores coordinates of a current pixel. In the first embodiment of the second principle, the target area is given as a predetermined area.

The area determination circuit 107 then determines whether coordinates of a current pixel lie within the target area, and sends the result to the background-density detection circuit 108. The background-density detection circuit 108 finds the minimum value of all the pixel values within the target area so as to output the minimum value as a background density.

In the first embodiment, the background density is detected by using a predetermined region other than proximities of edges of an image data scanned by the scanner 101. The reason for this is that image data of the edge proximities lacks reliability, since, for example, the press board might be loose creating a gap between itself and an original image sheet. Thus, the target area is set by excluding the image data of the edge proximities in order to enhance reliability.

Figure 10:
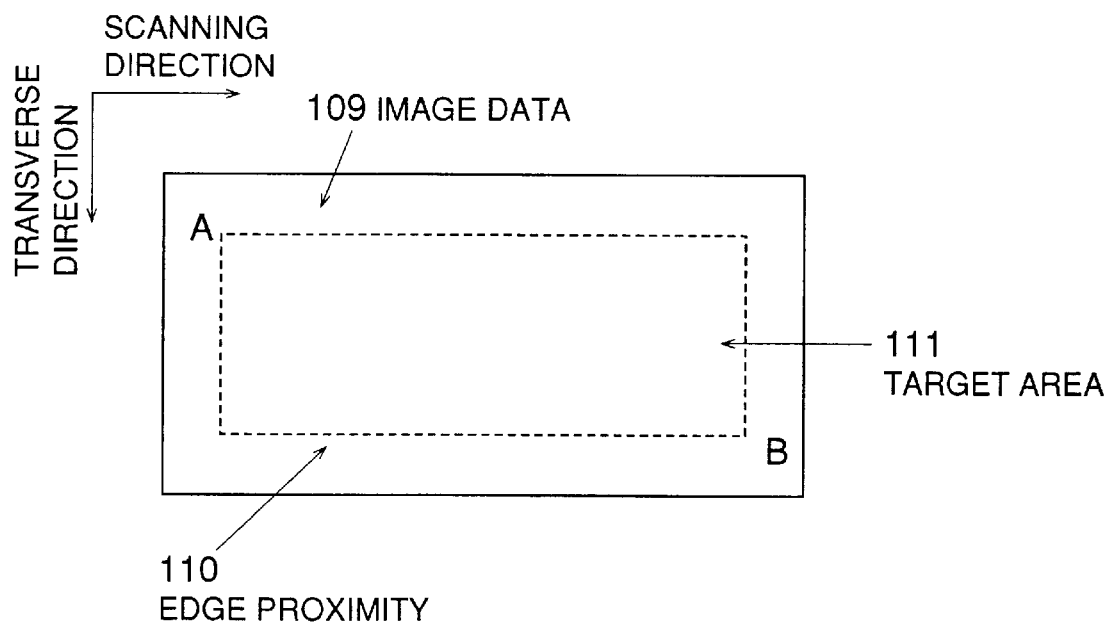
FIG. 10 is an illustrative drawing showing a target area for detecting a background density, which target area is predetermined in the first embodiment.

FIG. 10 is an illustrative drawing showing the target area for detecting the background density. A target area 111 defined by coordinates of point A and B is predetermined, and excludes an edge proximity 110 of image data 109. At a start of processing, the coordinates of the points A and B are loaded in the register 105 by a CPU (central processing unit, not shown). Also, coordinates of the current pixel are set in the register 106. The coordinates of the current pixel are determined from a synchronizing signal for pixels and a line synchronizing signal generated at a time of switching a scanning line, wherein these signals are also used for driving the scanner 101 and other image processing parts. A coordinate in the transverse direction is incremented by 1 each time the line synchronizing signal is set. A coordinate in the scanning direction is incremented by 1 each time the synchronizing signal is updated, and is reset to zero when the line synchronizing signal is set.

The coordinates stored in the registers 105 and 106 are sent to the area determination circuit 107. The area determination circuit 107 compares the coordinates (a scanning direction coordinate and a transverse direction coordinate) of the current pixel with those of the target area so as to determine whether the coordinates of the current pixel lie within the target area. The result of the comparison is sent to the background-density detection circuit 108, which receives image data logarithmically transformed. The background-density detection circuit 108 finds the minimum value of all pixels determined to be within the target region, and outputs this minimum value as the background density.

The background-density detection circuit 108 is not limited to that of the above example, but can be any circuit or method as long as it generates a representative value of the background density within the target area. For example, the background density can be an average of pixel values which are smaller than a predetermined density. Also, instead of the background density, other variables such as hue, brightness, chroma, and luminance of the background can be detected as an output. An example of hue is a density balance of the background R, G, and B, i.e., the ratio of the R signal to the G signal and the ratio of the R signal to the B signal.

Figure 11:
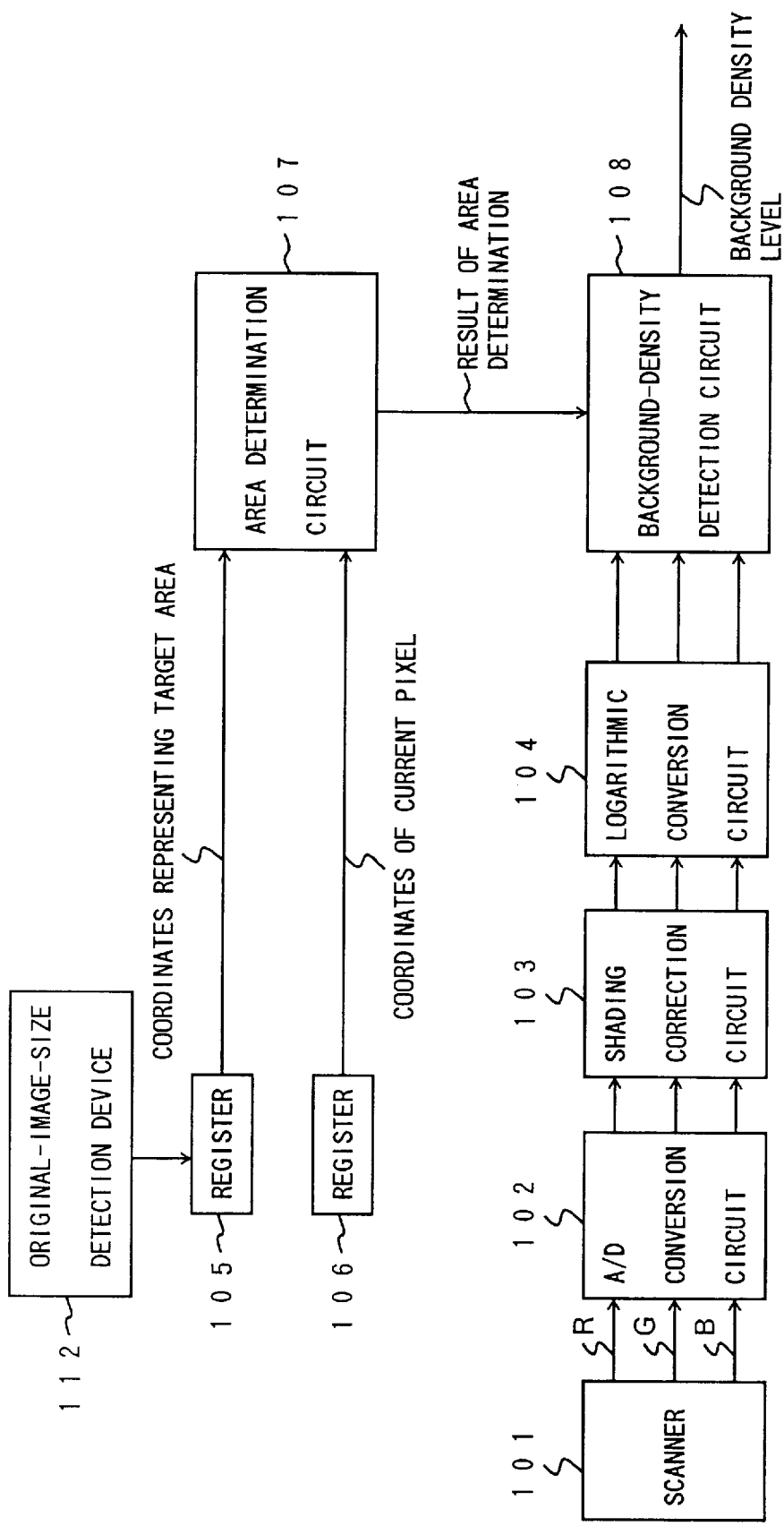
FIG. 11 is a block diagram of a second embodiment of an image processing device according to the second principle of the present invention.

FIG. 11 shows a second embodiment of the second principle. This embodiment is provided with an original-image-size detection device 112, which produces coordinates defining an area of the original image and supplies the coordinates to the register 105. Thus, the target area is defined by these coordinates. Other components are the same as those of the first embodiment of the second principle.

Typically, a copy machine is provided with various sensors, including a sheet-size detection sensor such as a sheet-length detection sensor for detecting predetermined sizes like A4 and B5 and a sheet-width detection sensor. The original-image-size detection device 112 can be comprised of these prior art sensors. Also, precision in detecting the size can be enhanced by increasing a number of the sensors.

FIG. 12 is an illustrative drawing showing a detection of an original image size, which is used for deciding the background density. In the example shown in FIG. 12, an original image area 113 is detected by a sheet-length detection sensor 114 with regard to the scanning direction and by a sheet-width detection sensor 115 with regard to the transverse direction. Then, coordinates of points A and B thus detected are stored in the register 105. These coordinates representing the target area are provided for the area determination circuit 107, along with coordinates of the current pixel. Operations of the area determination circuit 107 and the background-density detection circuit 108 are the same as those of the first embodiment, and a description thereof is omitted.

Figure 13:
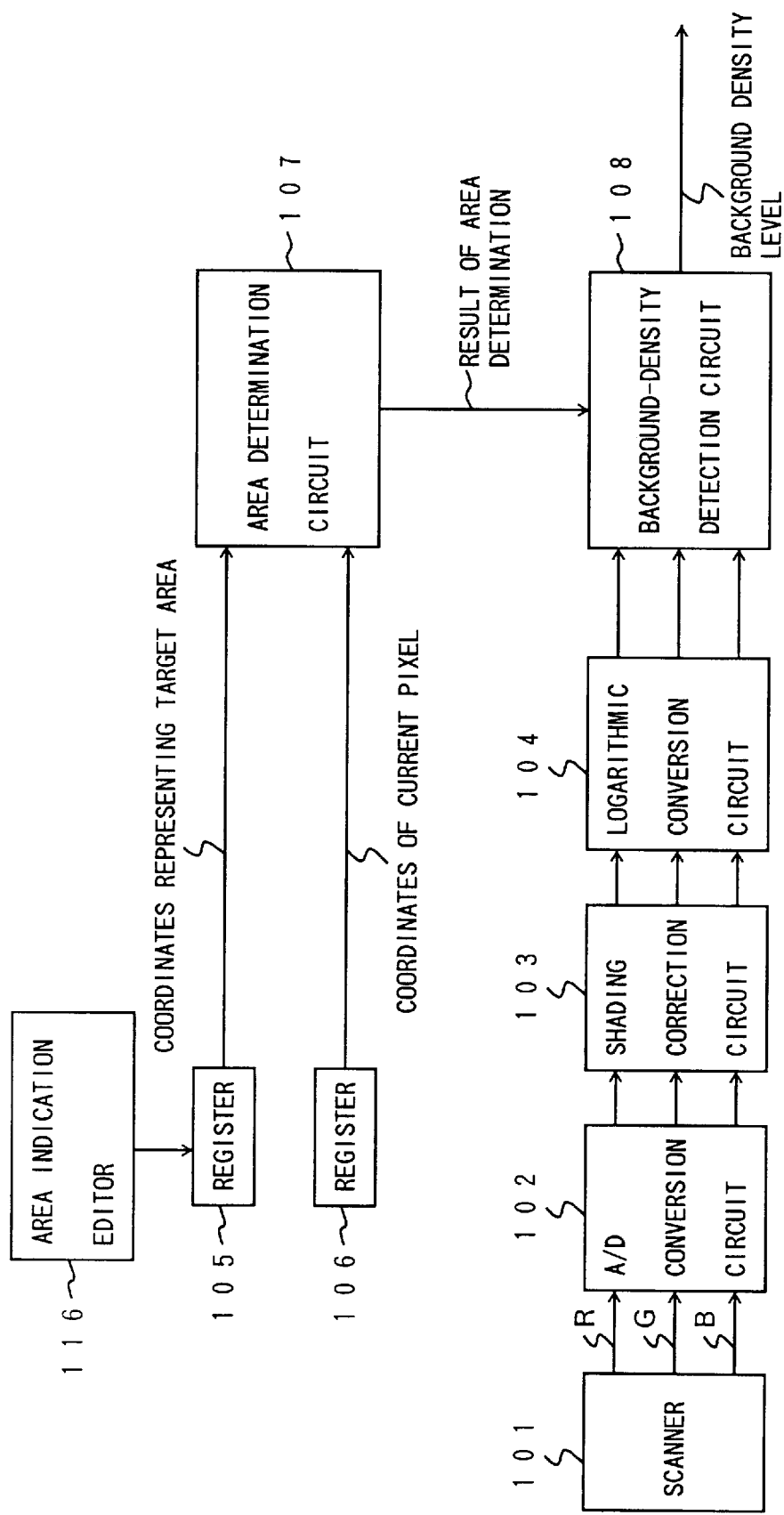
FIG. 13 is a block diagram of a third embodiment of an image processing device according to the second principle of the present invention.

FIG. 13 shows a third embodiment of the second principle. In the third embodiment, the target area for detecting the background density is determined by an operator of the machine. In FIG. 13, the third embodiment differs from the second embodiment only in that an area indication editor 116 is substituted for the original-image-size detection device. A schematic construction of the editor 116 is shown in FIG. 14.

In FIG. 14, a sheet 118 bearing an original image is placed on an axis board 117, which is provided for an image processing device such as a copy machine. By using a touch pen 119, the operator defines two points diagonally opposing each other. Then, the operator uses a predetermined function key to set coordinates of these two points in the register 105.

FIG. 15 shows an example of an area defined by two points A and B entered by the operator. The coordinates of the points A and B representing the target area, along with coordinates of the current pixel, are provided for the area determination circuit 107. Operations of the area determination circuit 107 and the background-density detection circuit 108 are the same as those of the first and second embodiments, and will be given no further description.

A fourth embodiment of the second principle will be described below with reference to the accompanying drawings. The fourth embodiment of the second principle detects background areas by utilizing the fact that pictures or letters of an original image are surrounded by background areas. More particularly, this embodiment detects an area having pictures or letters on both sides thereof, and uses this area for detecting the background density.

Figure 16:
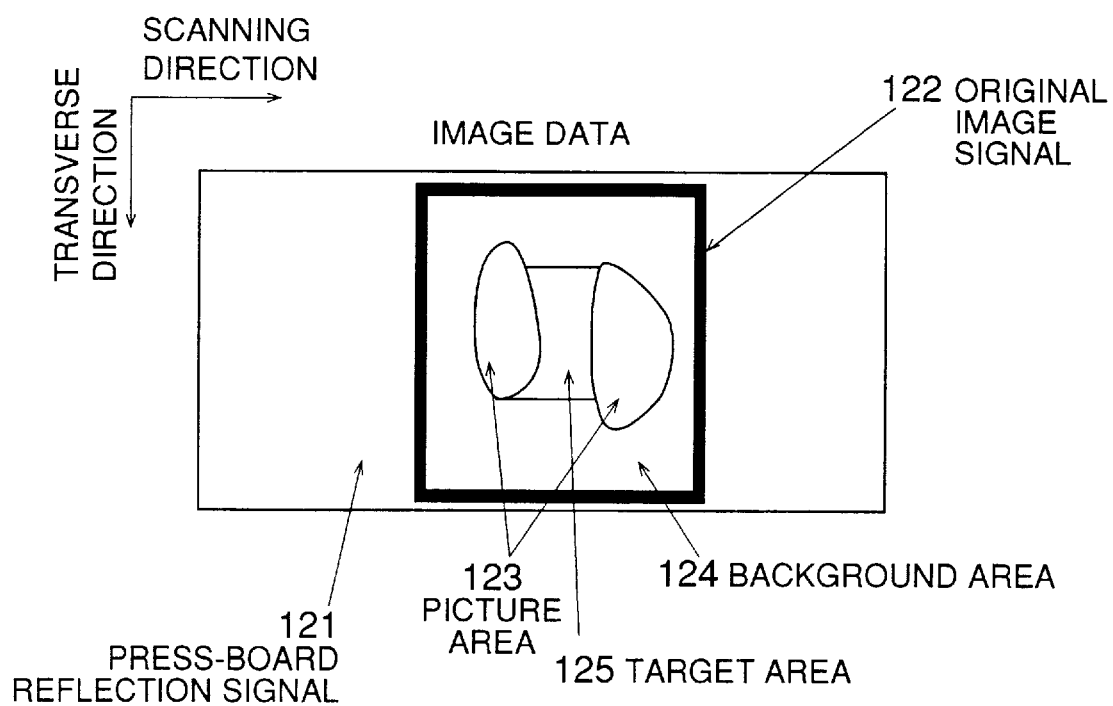
FIG. 16 is an illustrative drawing showing a target area for detecting a background density in a fourth embodiment of the second principle of the present invention.

FIG. 16 is an illustrative drawing showing image data including the target area for detecting the background density. In FIG. 16, the image data includes a press-board reflection signal 121 and an original image signal 122. The original image signal 122 includes signals from picture areas 123, a background area 124, and the target area 125 placed between the picture areas for detecting the background density.

Figure 17:
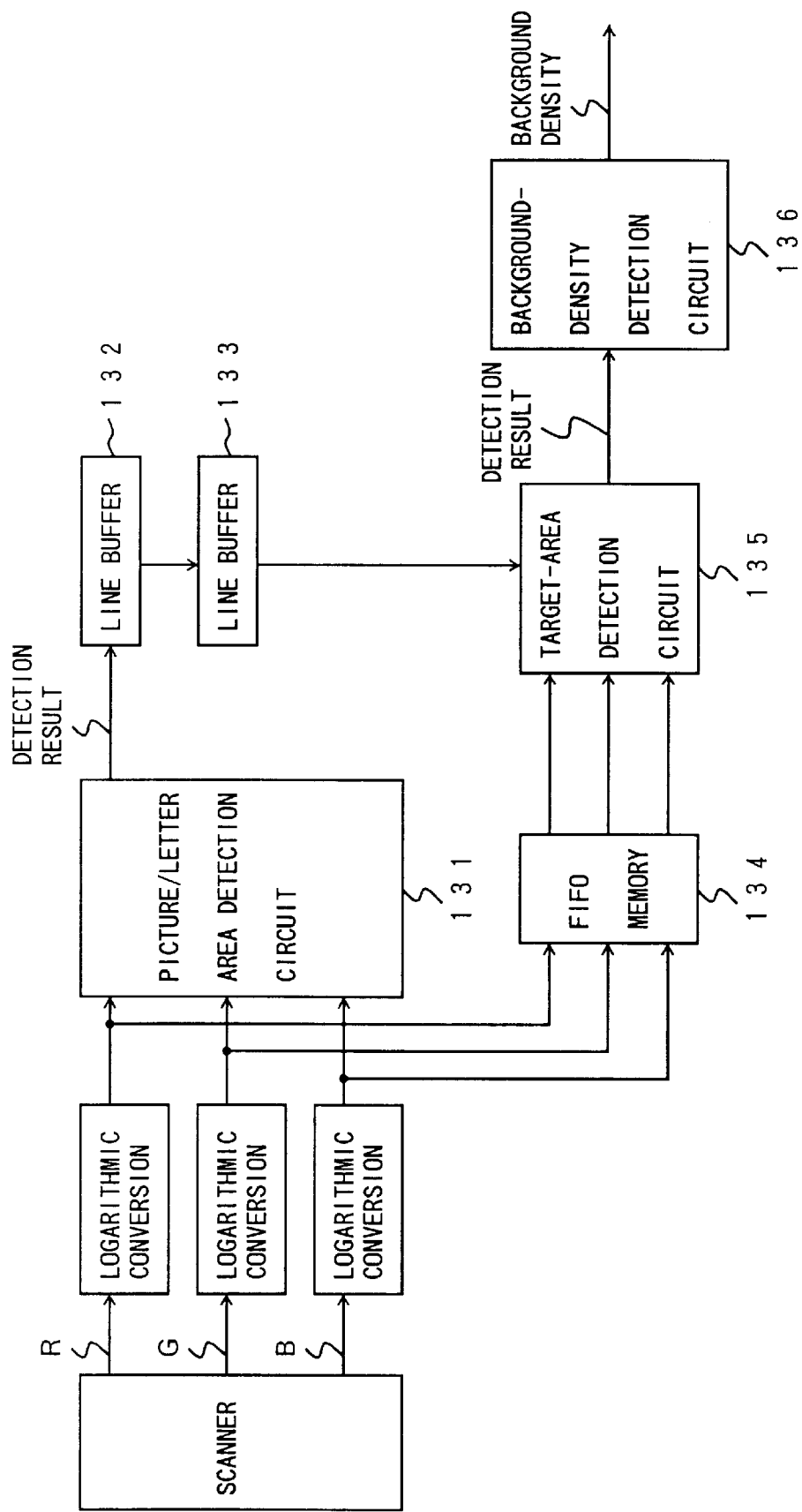
FIG. 17 is a block diagram of the fourth embodiment of an image processing device according to the second principle.

FIG. 17 shows a block diagram of the fourth embodiment of an image processing device according to the second principle. The image processing device includes a picture/letter area detection circuit 131, line buffers 132 and 133, a FIFO (first in-first out) memory 134, a target-area detection circuit 135, and a background-density detection circuit 136.

In FIG. 17, the picture/letter area detection circuit 131 detects picture areas and letter areas within image data read from an original image sheet. This is done by an image-area separation technique, and an example of such a technique is proposed in the paper, "Segmentation Method for Documents Containing Text/Picture (Screened Halftone, Continuous Tone)", Transactions of Institute of Electronics, Information and Communication Engineers, Vol.J75-D-II, No.1, pp. 39–47. The results of the picture/letter area detection are sent to the line buffer 132, which stores the results in a series. When a scan line is switched to a next line, a memory content of the line buffer 132 is copied to the line buffer 133, and then is cleared. Then, the same procedure is repeated for each new line.

Figure 18:
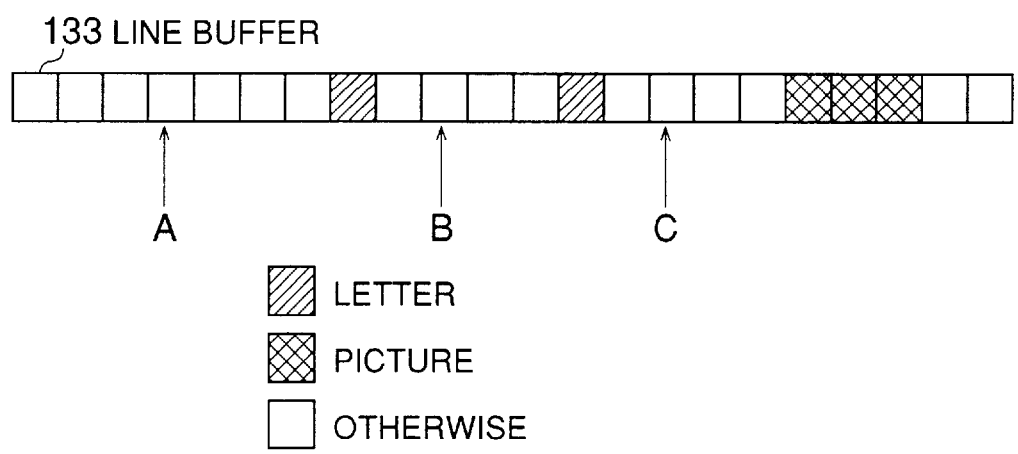
FIG. 18 is an illustrative drawing showing results of picture/letter area detection stored in a line buffer of FIG. 17.

FIG. 18 is an illustrative drawing of the memory content of the line buffer 133. As shown in the figure, the results of the picture/letter area detection stored for one line are stored in the line buffer 133 such that, for example, pixels evaluated as comprising pictures or letters are set to 1, and pixels evaluated as comprising otherwise are set to 0.

The target-area detection circuit 135 determines whether the current pixel belongs to an area laying between picture or letter areas. In order to make this determination, results of an image-area separation process for a line which includes the current pixel must be available. To assure this, the FIFO memory 134 is used to delay the image data transfer by one line. That is, when each pixel in an n-th line is evaluated in the target-area detection circuit 135 as to whether it belongs to the target area, the line buffer 133 holds the results of the image-area separation process for the n-th line. At this point of time, the picture/letter area detection circuit 131 is carrying out an image-area separation process for the next, n+1-th line.

Figure 19:
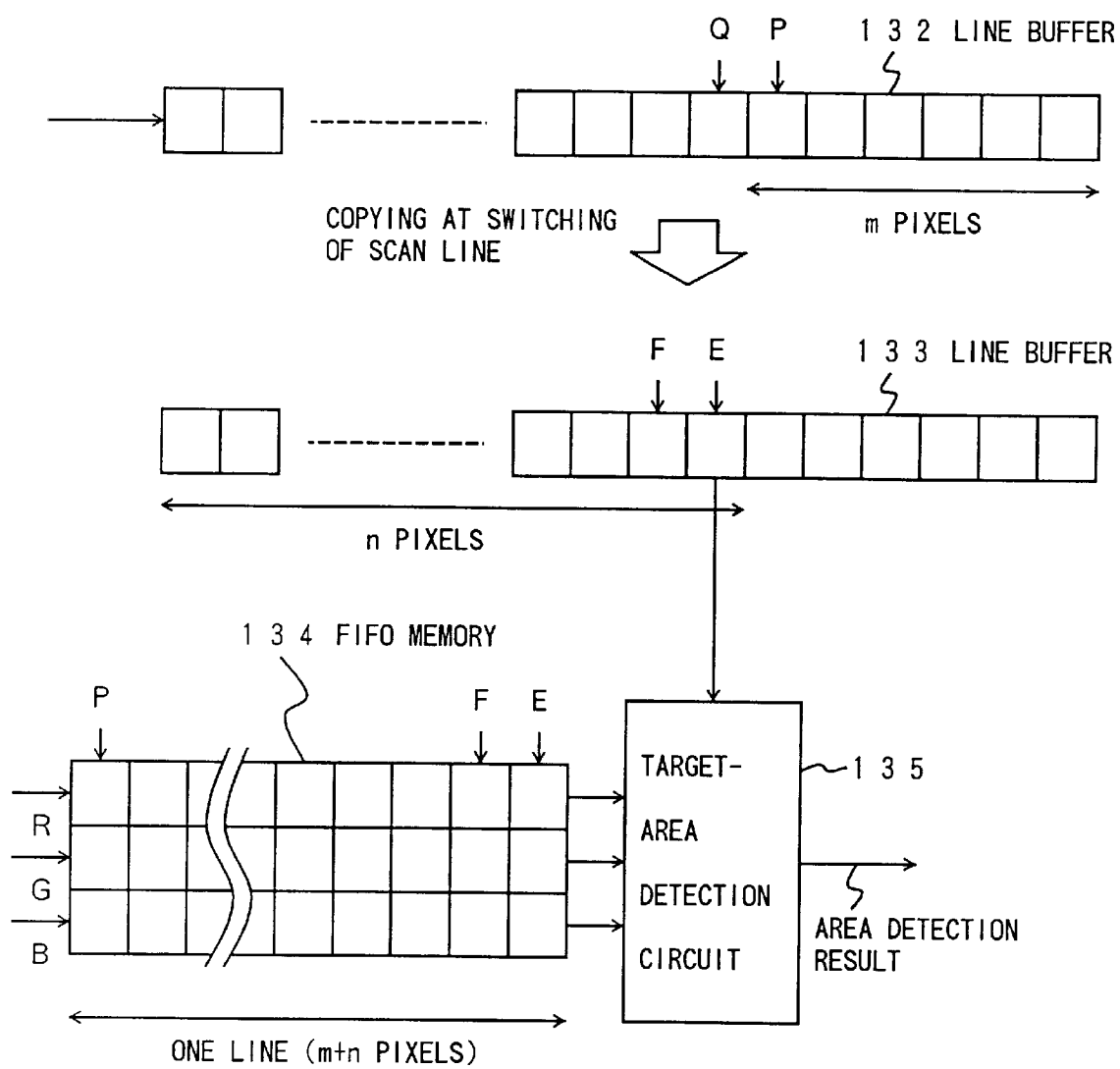
FIG. 19 is an illustrative drawing showing operations of line buffers and a FIFO memory of FIG. 17.
Figure 22A:
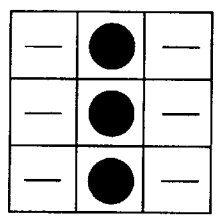
FIGS. 22A to 22D are illustrative drawings showing patterns used in a pattern matching process which detects continuity of black pixels.
Figure 22B:
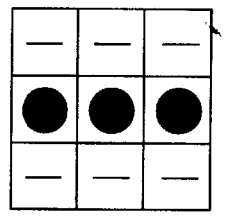
Figure 22C:
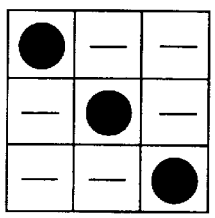
Figure 22D:
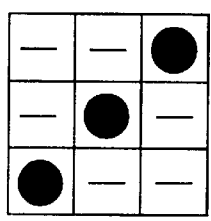
Figure 23A:
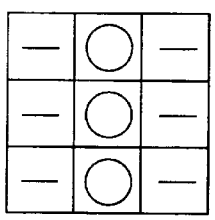
FIGS. 23A to 23D are illustrative drawings showing patterns used in a pattern matching process which detects continuity of white pixels.
Figure 23B:
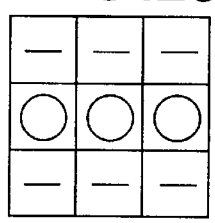
Figure 23C:
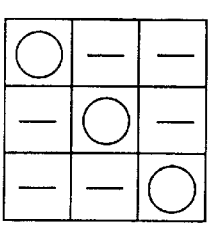
Figure 23D:
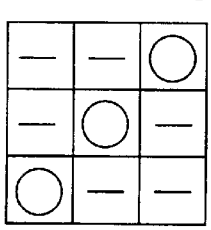

FIG. 19 is an illustrative drawing showing timing between the line buffers 132 and 133 and the FIFO memory 134. Here, each line is comprised of pixels. FIG. 19 shows a moment at which a pixel P has just been stored, where the pixel P is an m-th pixel of a given line so that m−1 pixels of the same line are already stored in the line buffer 132. In the line buffer 133, all pixels of a previous line are stored. In the FIFO memory 134, the pixel P is stored in a memory location for the most recent input (the left most location in FIG. 19). And the m−1 pixels of the given line coming before the pixel P and n pixels of the previous line are stored in the rest of the FIFO memory 134.

A first pixel E to exit from the FIFO memory 134 belongs to the previous line, and the results of the image-area separation process for all the pixels of the previous line are stored in the line buffer 133. A result of the image-area separation process for the first pixel E is stored in the line buffer 133 at an n-th location from the left. The target-area detection circuit 135 carries out a process for detecting the target area by taking the first pixel E out of the FIFO memory 134. When the pixel E is taken out of the FIFO memory 134, a pixel Q next to the pixel P is written into the FIFO memory 134 at the left most location. At the same time, a result of the image-area separation process for the pixel Q is stored in the line buffer 132.

The target-area detection circuit 135 examines pixels on both sides of the pixel E stored in the line buffer 133. When there are picture areas or letter areas on both sides, it is decided that the pixel E is part of the target area for detecting the background density. With reference to the example of FIG. 18, when a current pixel to be evaluated is A, it is decided that the current pixel is not part of the target area, since there is a letter area to the right but no picture or letter area to the left. When the current pixel is B or C, it is decided that the current pixel is part of the target area, since there are picture or letter areas on both sides. When a current pixel is evaluated as belonging to the target area, the current pixel from the FIFO memory 134 is marked by such means as a flag, and is sent to the background-density detection circuit 136. The background-density detection circuit 136 obtains the minimum value of all pixels within an area marked by flags, and outputs the minimum value as a background density.

When the process for the first pixel E is finished, the same process is carried out for a next pixel F stored in the FIFO memory 134.

The method of detecting a background level according to the fourth embodiment detects the background area by examining both sides of the current pixel to determine if there are picture or letter areas on both sides. Thus, this method is effective even when a density of the background is rather high or has a chromatic color.

As mentioned before, the image area separation technique used here may be the one described in the above-mentioned paper. In this technique, pixels forming pictures are detected by selecting pixels which are at a local peak or at a local bottom. FIG. 20 is provided as an example for explaining the technique. As shown in FIG. 20, a central pixel and a 3×3 block of pixels including the central pixel are taken into consideration. If a density L of the central pixel is higher or lower than any of surrounding pixels and if densities (a, b) of a pair of diagonally opposing pixels are such that |2L-a-b|>TH (TH: a predetermined threshold) is satisfied for all the pairs of pixels, the central pixel is decided to be a local peak or a local bottom, i.e., a pixel of the pixels forming pictures.

A technique proposed in the same paper may be used for detection of letter (edge) areas. FIG. 21 shows a block diagram of a letter (edge) area detection unit. The letter area detection unit includes a three-state circuit 141, a black-pixel-continuity detection circuit 142, a white-pixel-continuity detection circuit 143, and an AND circuit 144. The three-state circuit 141 receives image data, performs edge enhancement on the image data, and categorizes each pixel value of the image data into three groups by using two predetermined threshold values TH1 and TH2. Namely, a given pixel is turned into a white pixel if it is less than TH1, is turned into a density pixel if it is less than TH2 and more than or equal to TH1, and is turned into a black pixel if it is more than or equal to TH2. The black-pixel-continuity detection unit 142 and the white-pixel-continuity detection unit 143 detect areas of continuous black pixels and of continuous white pixels, respectively, by means of pattern matching.

FIGS. 22A to 22D show patterns used in the pattern matching for detecting areas of continuous black pixels. FIGS. 23A to 23D show patterns used in the pattern matching for detecting areas of continuous white pixels. In the black-pixel-continuity detection unit 142 and the white-pixel-continuity detection unit 143, areas of continuous black pixels and of continuous white pixels are detected, respectively, if they are matched with one of these patterns. The AND circuit 144 outputs a center pixel as a letter area, if a block of pixels containing the center pixel matches one of these patterns.

Figure 24:
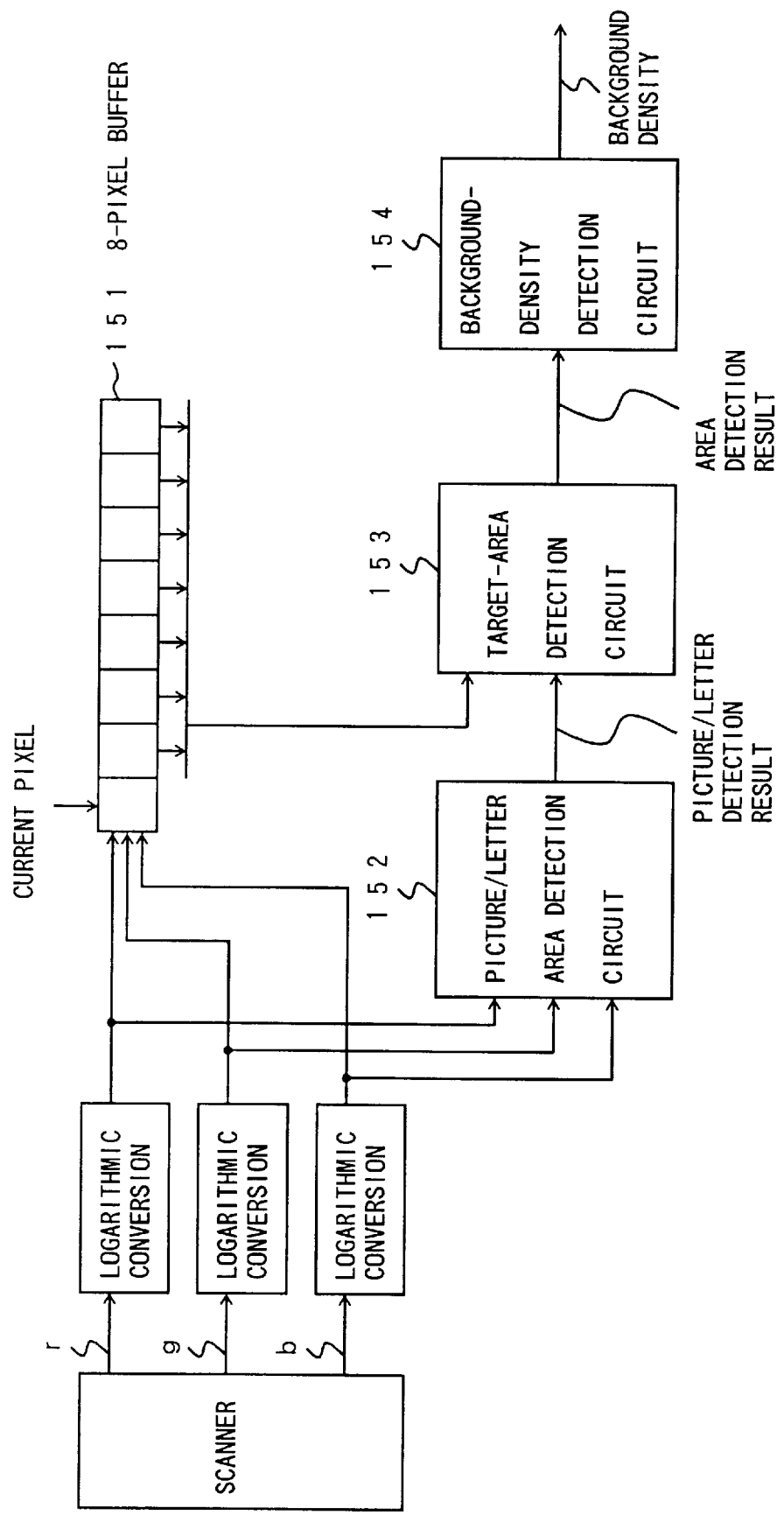
FIG. 24 is a block diagram of a fifth embodiment of an image processing device according to the second principle of the present invention.

A fifth embodiment of the second principle will be described below. The fifth embodiment uses a proximity of a picture or letter area as a target area for detecting the background density. FIG. 24 shows a block diagram of an image processing device according to the fifth embodiment. The image processing device includes a 8-pixel buffer 151, a picture/letter area detection circuit 152, a target-area detection circuit 153, and a background-density detection circuit 154. The 8-pixel buffer 151 holds the R, G, and B data of seven pixels immediately preceding a current pixel in a scan line. The size of the buffer is not limited to 8 pixels, but can be any size which can hold an appropriate number of pixels preceding the current pixel. The picture/letter area detection circuit 152 detects by using an image separation technique whether the current pixel belongs to a picture/letter area.

The target-area detection circuit 153 receives the result of the detection from the picture/letter area detection circuit 152. If the result indicates that the current pixel belongs to a picture/letter area, the target-area detection circuit 153 reads out the seven-pixel data stored in the 8-pixel buffer 151 preceding the current pixel, which data constitutes the proximity of a picture/letter area. Here, the reading out of the seven pixels is carried out serially. Then, the target-area detection circuit 153 passes the seven bits to the background-density detection circuit 154.

FIG. 25 is an illustrative drawing showing an example of image data including the target area for detecting the background density. In FIG. 25, the image data includes a press-board reflection signal and an original image. The original image includes a picture area, a background area, and the target area adjacent to the picture area. The background-density detection circuit 154 detects a density of the background in the same manner as in the first embodiment of the second principle.

In the fifth embodiment, the target area is detected in the proximity of the current pixel which belongs to a picture/letter area. Thus, the method of detecting the target area according to this embodiment is effective, even if a background density is rather high or has a chromatic color.

Figure 26:
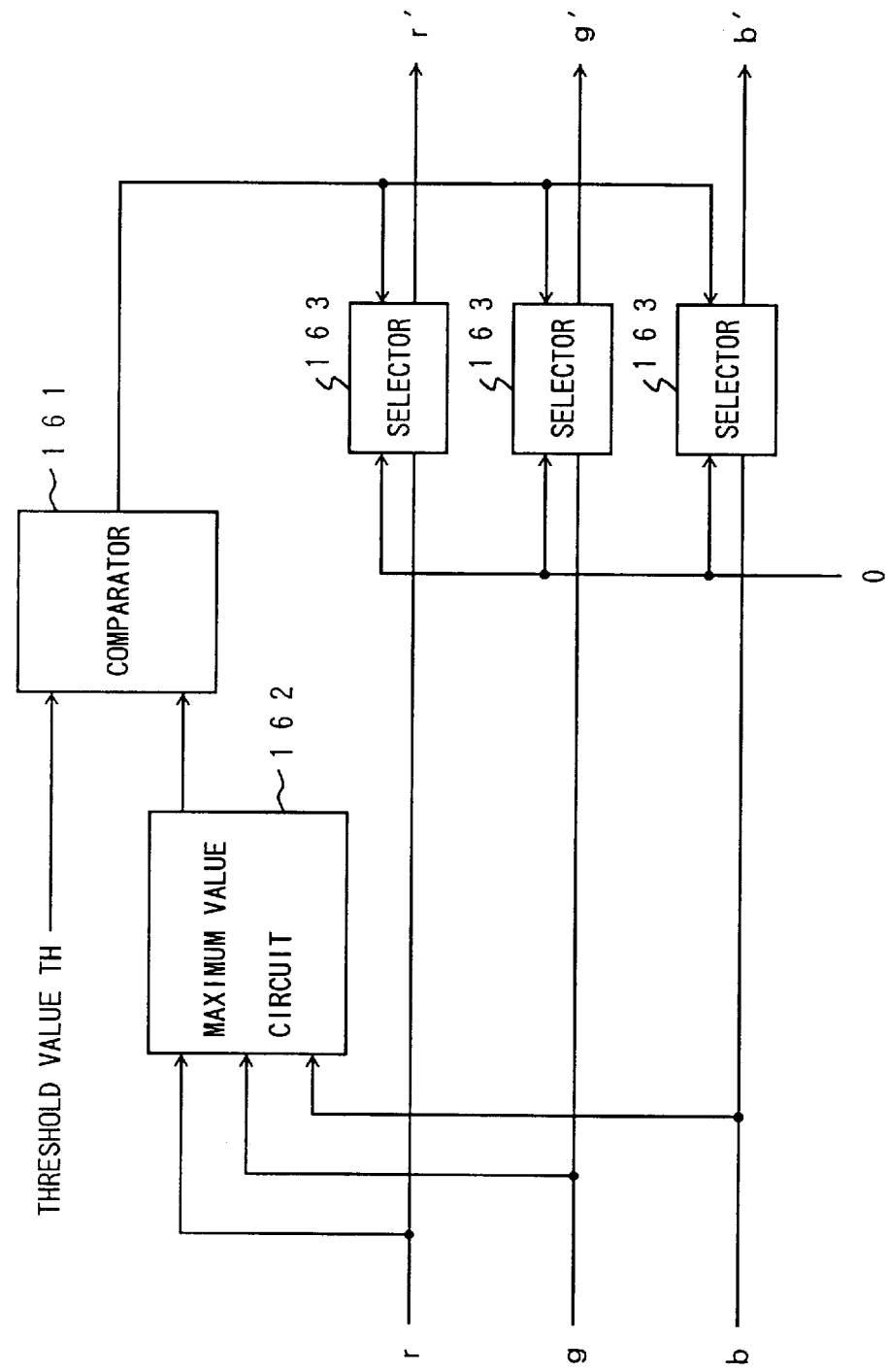
FIG. 26 is a block diagram of a sixth embodiment of an image processing device according to the second principle of the present invention.

FIG. 26 shows a block diagram of an image processing device according to a sixth embodiment for removing background noise from image data by using the background density detected in one of the first to fifth embodiments. Input signals r, g, and b and output signals r', g', and b' are in a linear relationship with densities.

In FIG. 26, the image processing device includes a comparator 161, a maximum value circuit 162, and selectors 163. The maximum value circuit 162 finds the maximum value of the three input signals r, g, and b. The comparator 161 compares this maximum value with a threshold value TH, which is detected in accordance with one of the embodiments of the second principle. If the maximum value is less than TH, the comparator 161 regards a current pixel as that of the background, and controls the selectors 163 to select (0, 0, 0). Thus, the selectors 163 output (r', g', b') equal to (0, 0, 0), i.e. signals in which background noise is removed. If the maximum value is more than or equal to TH, the comparator 161 controls the selectors 163 to select the input signals (r, g, b). Thus, the selectors 162 output (r', g', b') equal to (r, g, b).

FIG. 27 shows a block diagram of a color copy machine according to a seventh embodiment of the second principle, which incorporates the first principle of the present invention. This color copy machine is of a four-drum type which prints four colors to form one whole image one after another. The color copy machine scans an original image four times, which scans are for K, C, M, and Y signals. In the seventh embodiment, removal of the background noise is carried out at the time of generating the K, C, M, and Y signals.

In FIG.27, a scanner and a logarithmic conversion circuit are the same as those of the first embodiment of the second principle, and will not be given a further description. In addition to these elements, the copy machine includes a color-correction processing circuit 171, a background-removal processing circuit 172, a level conversion circuit 173, and a printer 174. The color-correction processing circuit 171 converts R, G, and B signals into C, M, Y, and K signals by using linear transformations such as those which follow.

$$C = a0 + a1 \times R + a2 \times G + a3 \times B$$

$$M = b0 + b1 \times R + b2 \times G + b3 \times B$$

$$Y = c0 + c1 \times R + c2 \times G + c3 \times B$$

$$K = d0 + d1 \times R + d2 \times G + d3 \times B$$

Here, R, G, and B are signals after the logarithmic conversion, C, M, Y, and K are printer drive signals, and a0 to a3, b0 to b3, c0 to c3, and d0 to d3 are color correction coefficients.

The background removal circuit 172 removes background noise from the image data by using a background density. The level conversion circuit 173 converts the C, M, Y, and K signals into signals which are suitable for the capacity of the printer 174 with regard to representing densities.

The seventh embodiment is characterized by its order of printing. That is, a black (K) version is first printed. Then, cyan (C), magenta (M), and yellow (Y) versions are printed in a series to accomplish the printing of four versions on the same sheet of paper. An order of printing C, M, and Y versions is not limited to this example. At the first scan, a density of background is detected, and then used for the following scans in order to remove background noise. In the following, an operation of the seventh embodiment will be explained with reference to a flow-chart of FIG. 28.

At a step S101, it is checked whether a current processing is for the K version. If it is, a background density TH is detected at a step S102 by using one of the methods of the first to fifth embodiments. At a step S103, the background density TH is stored in a register of the image processing device. Then, the procedure goes back to the step S101. Thus, there is no background removal at the time of the K version processing. If it turns out at the step S101 that a current processing is not for the K version, the procedure goes to a step S104. At the step S104, background noise is removed by using the method of the sixth embodiment with the background density TH as a threshold value. At a step S105, a check is made whether processing for all the versions are completed. If it is not, the procedure goes back to the step S101. If it is, the procedure is finished.

The seventh embodiment of the second principle is not limited to the above example, and various variations can be made. For example, a threshold value used for the Y version processing can be that detected at the time of the C version processing or the M version processing, instead of the threshold value detected at the time of the K version processing. Similarly, a threshold value used for the M version processing can be detected at the time of the C version processing, instead of at the time of the K version processing. Also, since this embodiment can be applied to image processing devices performing a plurality of scans, a threshold value can be detected at the time of a prescan so as to be used for removing background noise at the time of following color scans.

Figure 29:
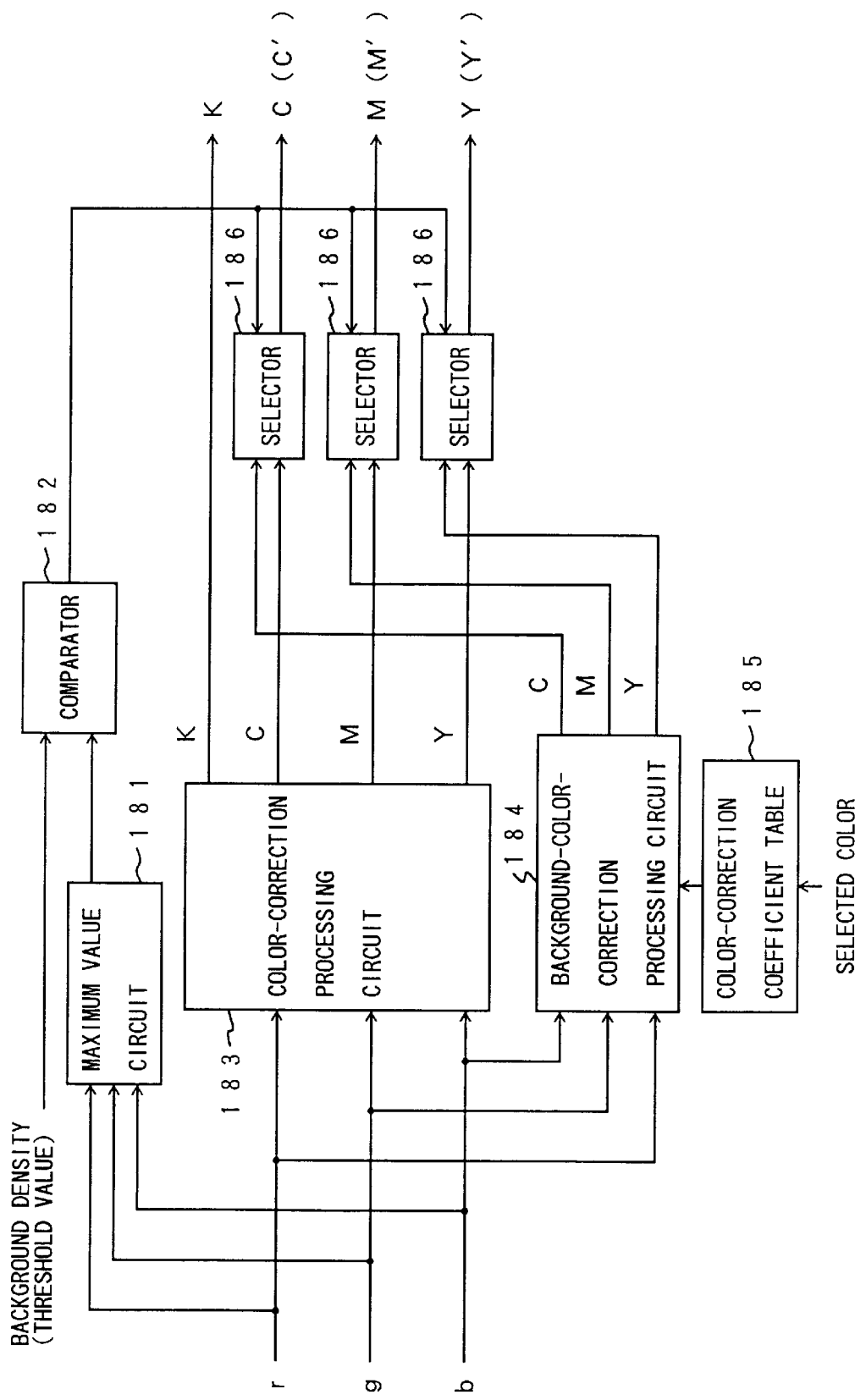
FIG. 29 is a block diagram of an eighth embodiment of an image processing device according to the second principle of the present invention.

FIG. 29 shows a block diagram of an image processing device according to an eighth embodiment of the second principle, which device performs a color conversion process to convert a background color into a predetermined color. The image processing device includes a maximum value circuit 181, a comparator 182, a color-correction processing circuit 183, a background-color-correction processing circuit 184, a color-correction coefficient table 185, and selectors 186.

In FIG. 29, the maximum value circuit 181 finds the maximum value of three input signals r, g, and b. The comparator 182 compares this maximum value with a background density in order to control the selectors 186. These elements are the same as those of the sixth embodiment. The color-correction processing circuit 183 converts the r, g, and b signals into K, C, M, and Y signals by using conventional color-correction coefficients in the same manner as in the seventh embodiment.

The color-correction coefficient table 185 is comprised of a memory such as a ROM or a RAM storing a table of color-correction coefficients. According to a color selected (e.g, by a key operation by an operator), some color-correction coefficients are read out from the table to be provided for the background-color-correction processing circuit 184. Then, the background-color-correction processing circuit 184 carries out color correction such as follows.

$$C = \alpha 0 + \alpha 1 \times r + \alpha 2 \times g + \alpha 3 \times b$$

$$M = \beta 0 + \beta 1 \times r + \beta 2 \times g + \beta 3 \times b$$

$$Y = \tau 0 + \tau 1 \times r + \tau 2 \times g + \tau 3 \times b$$

Here, $\alpha 0$ to $\alpha 3$, $\beta 0$ to $\beta 3$, and $\tau 0$ to $\tau 3$ are the color correction coefficients read from the table 185 according to the color selected.

Assume that a color is selected in advance, and that color-correction coefficients corresponding to that color are provided for the background-color-correction processing circuit 184. By using one of the methods of the first to fifth embodiments, a background density is detected and stored in a register at the time of the K version processing. At the time of each of the C, M, and Y version processings, the maximum value among the input data r, g, and b is compared with the background density by the comparator 182. If the maximum value is smaller than the background level, the selector 186 selects the outputs of the background-color-correction processing circuit 184. Otherwise, the selector 186 selects the outputs of the color-correction processing circuit 183. In this manner, a color of the background is changed to a selected color.

A ninth embodiment of the second principle is concerned with a level conversion method in which threshold values are changed in accordance with a background density. In a case where a printer has an output of 8 different levels, for example, threshold values used for a level conversion to 8 levels are controlled in this embodiment according to the background density.

Figure 30:
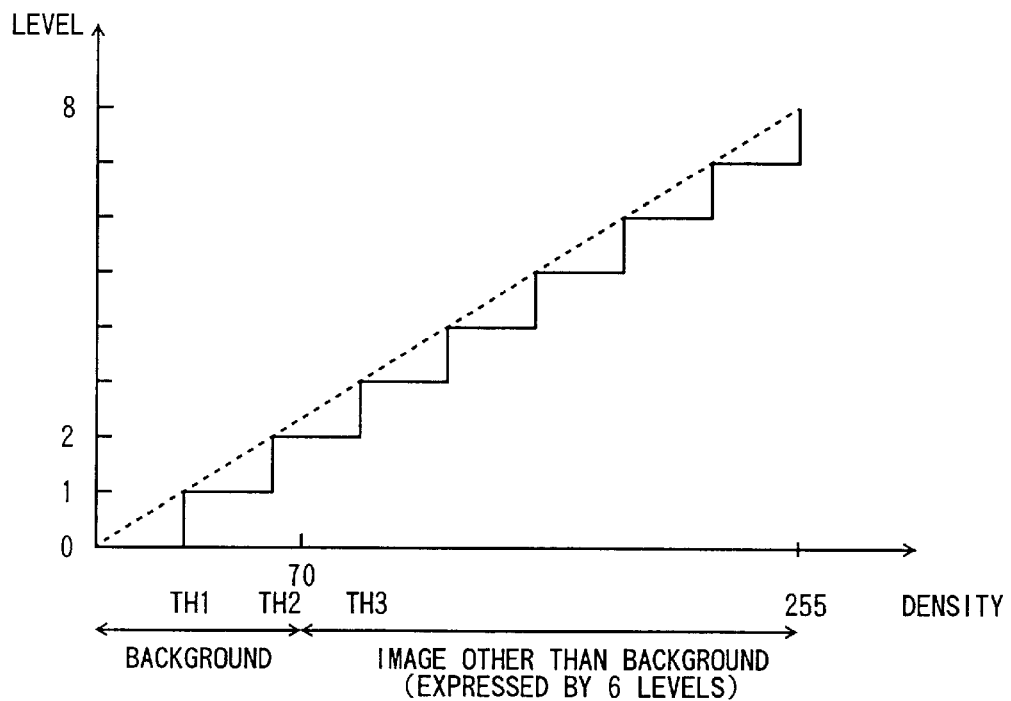
FIG. 30 is an illustrative drawing showing a level conversion process which assigns two of eight levels to a background.

A problem of no adaptive change in threshold values is as follows. Assume that data is in a linear relation with density with the whitest being zero and the blackest being 255. When the range between 0 and 255 is simply divided into 8 different levels, each density is assigned to one of the 8 different levels as shown in FIG. 30. Here, if a background density is 70, two levels end up being used for densities below the background density. Thus, only six levels are effectively used for expressing image data, leading to a degradation of image quality.

Figure 31:
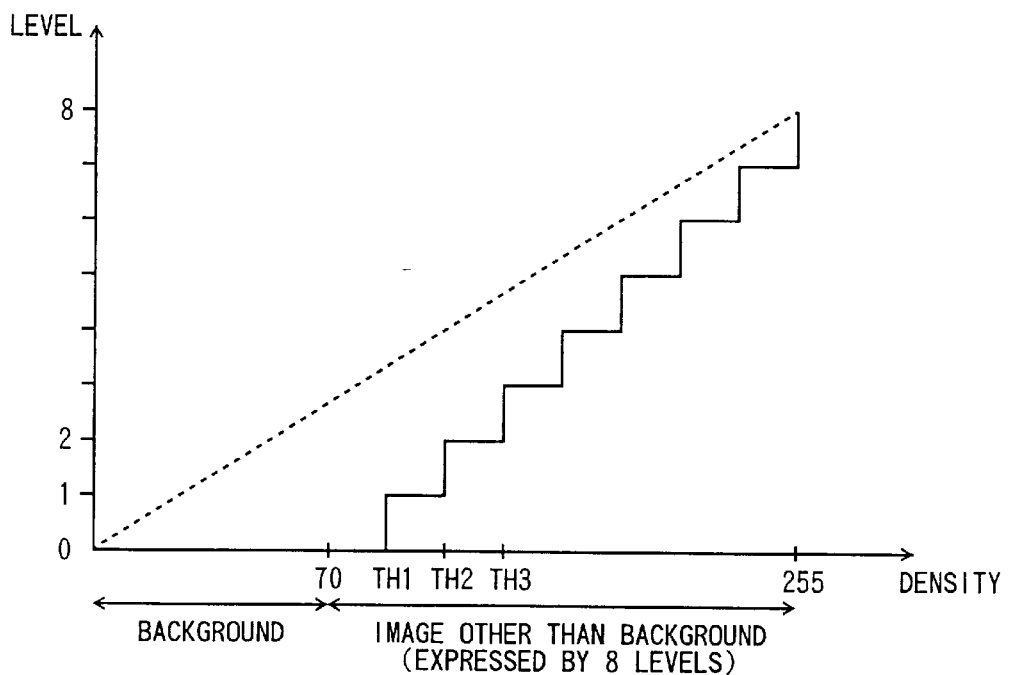
FIG. 31 is an illustrative drawing showing a level conversion process used in a ninth embodiment of the second principle.
Figures 32, 33:
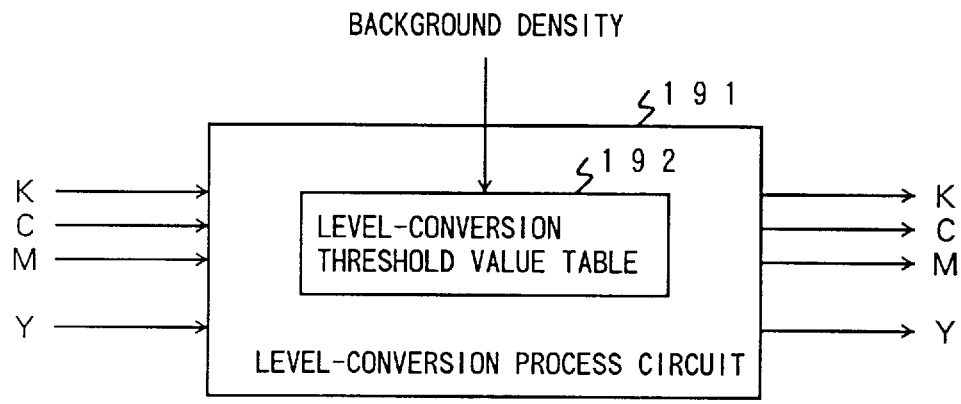
FIG. 32 is a block diagram of the ninth embodiment of an image processing device according to the second principle of the present invention.
FIG. 33 is an illustrative drawing showing an example of a level-conversion threshold value table of FIG. 32.

In the ninth embodiment of the second principle, threshold values for level conversion are determined so as to assign the 8 different levels to the range exceeding the background density as shown in FIG. 31, thus preventing the degradation of the image quality. FIG. 32 shows a structure of a level-conversion process circuit 191, which has been described with regard to the seventh embodiment. In the ninth embodiment, a background density is detected at the time of the K version processing, and is used for changing the threshold values of the level conversion process at the times of the C, M, and Y version processings. A level-conversion threshold value table 192 provided in the level-conversion circuit 191 has a plurality of tables corresponding to different background densities.

FIG. 33 shows an example of the level-conversion threshold value table 192. The level-conversion threshold value table 192 is comprised of three tables 193, 194, and 195 which are three sets of threshold values suitable for three groups of background densities. For example, when the background density is 10, the table 193 which is for the group of densities ranging from 0 to 20 is selected. Thus, 8 different levels expressed by values in the table 193 corresponding to TH1 to Th7 are used. When a given density is 70, for example, it is assigned to a second level.

In the ninth embodiment, a level conversion process is carried out by using a threshold value table which is selected in accordance with the background density. As for the K version processing, a default threshold value table is used because no background density is yet detected.

According to the first embodiment of the first principle, a threshold value for removing background noise can be determined reliably without conducting a prescan, and can be used for eliminating background noise for the second and following scans so that a resulting image has a high quality.

According to the second embodiment of the first principle, background noise can be removed from the first scan signal without the need for a prescan.

According to the third embodiment of the first principle, a signal which does not require removal of background noise is collected in the first scan. Thus, background noise can be removed so that a resulting image has a high quality without the need for a prescan.

According to the fourth embodiment of the first principle, reliable threshold values for eliminating background noise can be obtained without conducting a prescan even when there are variations in scanner characteristics. Thus, image quality of a resulting image can be further enhanced.

According to the first embodiment of the second principle, a target area for detecting a background density is restricted to a predetermined area within an original image. Thus, unreliable image data obtained from the edge proximity of the original image is excluded to enhance the reliability of the detecting of the background density.

According to the second embodiment of the second principle, an original-image-size detection device is used for distinguishing an original image from a press board, thus enhancing the reliability of the detecting of the background density.

According to the third embodiment of the second principle, an area indication editor is used for indicating an area of an original image, so that the reliable detection of a background density can be achieved.

According to the fourth embodiment of the second principle, an area laying between picture/letter areas is used as a target area for detecting a background density. Thus, even if there is little difference in densities between an original image and a press board, a background density of the original image can be detected reliably irrespective of a location of the original image.

According to the fifth embodiment of the second principle, an area in a proximity of picture/letter areas is used as a target area for detecting a background density. Thus, even if the background density is rather high or has a chromatic color, the background density can be detected reliably. Also, a hardware structure can be simplified compared to that of the fourth embodiment.

According to the sixth embodiment of the second principle, the background density obtained by one of the first to fifth embodiments is used for eliminating background noise. Thus, the background noise can be removed effectively to bring about a high-quality image.

According to the seventh embodiment of the second principle, a background density can be detected without conducting a prescan in an image processing device performing a plurality of scans. Thus, background removal processing can be made faster.

According to the eighth embodiment of the second principle, a background density can be detected without (or with) conducting a prescan in an image processing device performing a plurality of scans. Then, a predetermined color conversion process can be applied at a high speed to areas having a density smaller than the background density.

According to the ninth embodiment of the second principle, a background density can be detected without (or with) conducting a prescan in an image processing device performing more than one scan. Then, a level conversion process can be applied only to densities exceeding the background density, thus realizing an enhanced image quality of a reconstructed image.

Further, the present invention is not limited to these embodiments, but various variations and modifications may be made without departing from the scope of the present invention.

What is claimed is:

1. An image processing device forming a reproduced image from a plurality of color recording signals, each of which is generated at a corresponding one of scans on an original image and derived from color digital signals obtained at said corresponding one of said scans, said image processing device comprising:

a threshold-value generation unit generating a threshold value taking into account image characteristics of an entire image of said original image, said threshold value being obtained based on said color digital signals at a first one of said scans which is not a prescan; and a background removal unit reducing background noise in said reproduced image by employing different threshold operations between said first one of said scans and second and following ones of said scans, said threshold value taking into account image characteristics of an entire image of said original image being used at said second and following ones of said scans.

2. The image processing device as claimed in claim 1, wherein said color digital signals comprise an R (red component) digital signal, a G (green component) digital signal, and a B (blue component) digital signal, and said color recording signals comprise a K (black component) recording signal, a C (cyan component) recording signal, an M (magenta component) recording signal, and a Y (yellow component) recording signal, wherein said K recording signal is obtained at said first one of said scans.

3. The image processing device as claimed in claim 2, wherein said K recording signal includes no background noise, so that no threshold operation is employed at said first one of said scans.

4. The image processing device as claimed in claim 1, wherein a predetermined threshold value is used at a time of said first one of said scans to reduce said background noise.

5. The image processing device as claimed in claim 1, wherein a local threshold value is used at a time of said first one of said scans to reduce said background noise, said local threshold value being obtained locally from said original image and obtained in realtime as said first one of said scans progresses.

6. The image processing device as claimed in claim 1, wherein said threshold-value generation means further generates threshold values at said second and following ones of said scans, and threshold values generated prior to a given one of said scans are used at said given one of said scans.

7. An image processing device comprising:
   input means for reading an original image to produce digital image data;
   picture/letter area detection means for detecting picture/letter areas each of which is either a picture area or a letter area;
   target-area detection means, responsive to said picture/letter area detection means, for identifying portions of said digital image data which are placed between said picture/letter areas;
   background-density detection means for detecting a background density of said digital image data by using said portions;
   background removal means for eliminating background noise by using said background density; and
   output means for generating a reproduced image in which said background noise is eliminated.

8. The image processing device as claimed in claim 7, further comprising:
   first memory means for storing one line of results of said target-area detection means, said results corresponding to pixels of one scan line of said digital image data; and
   second memory means for storing said pixels of said one scan line,
   wherein said target-area detection means takes out one pixel from said second memory means and decides whether said one pixel is placed between said picture/letter areas, by using some of said results stored in said first memory means and corresponding to said one pixel and pixels on both sides of said one pixel.

9. the image processing device as claimed in claim 7, wherein said input means comprises means for scanning said original image more than one time to produce said digital image data at each time of said scanning, in order for said output means to generate said reproduced image, and wherein said background density is detected at a first one of said scanning which is not a prescan, and is used at second and following ones of said scanning.

10. The image processing device as claimed in claim 9, wherein said background removal means comprises:
    comparison means for comparing said digital image data with said background density, which digital image data is in a linear relation with density; and
    selection means for selecting zero when a density associated with said digital image data is smaller than said background density and for selecting said digital image data otherwise.

11. The image processing device as claimed in claim 9, further comprising:
    first means for carrying out a first color correction process on said digital image data; and
    second means for carrying out a second color correction process on said digital image data based on selected color correction coefficients,
    wherein said background removal means comprises:
    comparison means for comparing said digital image data with said background density, which digital image data is in a linear relation with density; and
    selection means for selecting an output of said second means when a density associated with said digital image data is smaller than said background density and for selecting an output of said first means otherwise.

12. The image processing device as claimed in claim 9, wherein said background removal means comprises means for carrying out a level conversion process suitable for said output means to generate said reproduced image by using threshold values changeable in accordance with said background density, so that a predetermined number of output levels are assigned to densities exceeding said background density.

13. An image processing device comprising:
    input means for reading an original image to produce digital image data;
    picture/letter area detection means for detecting picture/letter areas each of which is either a picture area or a letter area;
    target-area detection means, responsive to said picture/letter area detection means, for identifying portions of said digital image data which are in proximity of said picture/letter areas;
    background-density detection means for detecting a background density of said digital image data by using said portions;
    background removal means for eliminating background noise by using said background density; and
    output means for generating a reproduced image in which said background noise is eliminated.

14. The image processing device as claimed in claim 13, further comprising memory means for storing results of said target-area detection means, said results corresponding to a predetermined number of pixels preceding a given pixel in said digital image data, wherein said target-area detection means decides whether said given pixel is in said proximity, by using said results stored in said memory means.

15. The image processing device as claimed in claim 13, wherein said input means comprises means for scanning said original image more than one time to produce said digital image data at each time of said scanning, in order for said output means to generate said reproduced image, and wherein said background density is detected at a first one of said scanning which is not a prescan, and is used at second and following ones of said scanning.

16. The image processing device as claimed in claim 15, wherein said background removal means comprises:

- comparison means for comparing said digital image data with said background density, which digital image data is in a linear relation with density; and
- selection means for selecting zero when a density associated with said digital image data is smaller than said background density and for selecting said digital image data otherwise.

17. The image processing device as claimed in claim 15, further comprising:

- first means for carrying out a first color correction process on said digital image data; and
- second means for carrying out a second color correction process on said digital image data based on selected color correction coefficients, wherein said background removal means comprises:

- comparison means for comparing said digital image data with said background density, which digital image data is in a linear relation with density; and
- selection means for selecting an output of said second means when a density associated with said digital image data is smaller than said background density and for selecting an output of said first means otherwise.

18. The image processing device as claimed in claim 15, wherein said background removal means comprises means for carrying out a level conversion process suitable for said output means to generate said reproduced image by using threshold values changeable in accordance with said background density, so that a predetermined number of output levels are assigned to densities exceeding said background density.

* * * * *